(12) United States Patent
DiSalvo et al.

(10) Patent No.: US 6,437,953 B2
(45) Date of Patent: *Aug. 20, 2002

(54) CIRCUIT INTERRUPTING DEVICE WITH REVERSE WIRING PROTECTION

(75) Inventors: Nicholas L. DiSalvo, Levittown; William R. Ziegler, East Northport, both of NY (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/879,563

(22) Filed: Jun. 11, 2001

Related U.S. Application Data

(63) Continuation of application No. 09/379,138, filed on Aug. 20, 1999, now Pat. No. 6,246,558, which is a continuation-in-part of application No. 09/369,759, filed on Aug. 6, 1999, now Pat. No. 6,282,070, which is a continuation-in-part of application No. 09/138,955, filed on Aug. 24, 1998, now Pat. No. 6,040,967.

(51) Int. Cl.[7] ............................................... H02H 3/00
(52) U.S. Cl. ........................................................ 361/42
(58) Field of Search ........................ 361/42–50; 335/18, 335/21, 24, 26, 202

(56) References Cited

U.S. PATENT DOCUMENTS

| | | | |
|---|---|---|---|
| 4,034,266 A | 7/1977 | Virani et al. ................... | 361/42 |
| 4,595,894 A | 6/1986 | Doyle et al. ................... | 335/18 |
| 4,719,437 A | 1/1988 | Yun ............................. | 335/18 |
| 4,802,052 A | 1/1989 | Brant et al. .................... | 361/42 |
| 4,851,951 A * | 7/1989 | Foster, Jr. ..................... | 361/42 |
| 5,223,810 A | 6/1993 | Van Haaren ................... | 335/18 |
| 5,224,006 A | 6/1993 | MacKenzie et al. .......... | 361/45 |
| 5,594,398 A | 1/1997 | Marcou et al. ................. | 335/18 |
| 5,600,524 A | 2/1997 | Neiger et al. .................. | 361/42 |
| 5,805,397 A | 9/1998 | MacKenzie ................... | 361/42 |
| 6,040,967 A | 3/2000 | DiSalvo ........................ | 361/42 |
| 6,246,558 B1 * | 6/2001 | DiSalvo et al. ............... | 361/42 |

* cited by examiner

Primary Examiner—Ronald W. Leja
(74) Attorney, Agent, or Firm—Paul J. Sutton

(57) ABSTRACT

Resettable circuit interrupting devices, such as GFCI devices, that include reverse wiring protection, and optionally an independent trip portions and/or a reset lockout portion are provided. The reverse wiring protection operates at both the line and load sides of the device so that in the event line side wiring to the device is improperly connected to the load side, fault protection for the device remains. The trip portion operates independently of a circuit interrupting portion used to break the electrical continuity in one or more conductive paths in the device. The reset lockout portion prevents the reestablishing of electrical continuity in open conductive paths if the circuit interrupting portion is non-operational or if an open neutral condition exists.

20 Claims, 21 Drawing Sheets

CIRCUIT INTERRUPTING DEVICE WITH REVERSE WIRING PROTECTION

CROSS REFERENCE TO RELATED APPLICATIONS

This application is a continuation of application Ser. No. 09/379,138 filed Aug. 20, 1999, now U.S. Pat. No. 6,246,558 which is a continuation-in-part of application Ser. No. 09/369,759 filed Aug. 6, 1999, now U.S. Pat. No. 6,282,070 which is a continuation-in-part of application Ser. No. 09/138,955, filed Aug. 24, 1998, now U.S. Pat. No. 6,040,967 all of which are incorporated herein in their entirety by reference.

BACKGROUND

1. Field

The present application is directed to reset lockout devices including resettable circuit interrupting devices and systems such as ground fault circuit interrupters (GFCI's), arc fault circuit interrupters (AFCI's), immersion detection circuit interrupters (IDCI's), appliance leakage circuit interrupters (ALCI's), equipment leakage circuit interrupters (ELCI's), circuit breakers, contactors, latching relays and solenoid mechanisms.

2. Description of the Related Art

Many electrical wiring devices have a line side, which is connectable to an electrical power supply, and a load side, which is connectable to one or more loads and at least one conductive path between the line and load sides. Electrical connections to wires supplying electrical power or wires conducting electricity to the one or more loads are at line side and load side connections. The electrical wiring device industry has witnessed an increasing call for circuit breaking devices or systems which are designed to interrupt power to various loads, such as household appliances, consumer electrical products and branch circuits. In particular, electrical codes require electrical circuits in home bathrooms and kitchens to be equipped with ground fault circuit interrupters (GFCI), for example. Presently available GFCI devices, such as the device described in commonly owned U.S. Pat. No. 4,595,894, use an electrically activated trip mechanism to mechanically break an electrical connection between the line side and the load side. Such devices are resettable after they are tripped by, for example, the detection of a ground fault. In the device discussed in the '894 patent, the trip mechanism used to cause the mechanical breaking of the circuit (i.e., the conductive path between the line and load sides) includes a solenoid (or trip coil). A test button is used to test the trip mechanism and circuitry used to sense faults, and a reset button is used to reset the electrical connection between line and load sides.

However, instances may arise where an abnormal condition, caused by for example a lightning strike, occurs which may result not only in a surge of electricity at the device and a tripping of the device but also a disabling of the trip mechanism used to cause the mechanical breaking of the circuit. This may occur without the knowledge of the user. Under such circumstances an unknowing user, faced with a GFCI which has tripped, may press the reset button which, in turn, will cause the device with an inoperative trip mechanism to be reset without the ground fault protection available.

Further, an open neutral condition, which is defined in Underwriters Laboratories (UL) Standard PAG 943A, may exist with the electrical wires supplying electrical power to such GFCI devices. If an open neutral condition exists with the neutral wire on the line (versus load) side of the GFCI device, an instance may arise where a current path is created from the phase (or hot) wire supplying power to the GFCI device through the load side of the device and a person to ground. In the event that an open neutral condition exists, current GFCI devices, which have tripped, may be reset even though the open neutral condition may remain.

Commonly owned application Ser. No. 09/138,955, filed Aug. 24, 1998, which is incorporated herein in its entirety by reference, describes a family of resettable circuit interrupting devices capable of locking out the reset portion of the device if the circuit interrupting portion is non-operational or if an open neutral condition exists. Commonly owned application Ser. No. 09/175,228, filed Sep. 20, 1998, which is incorporated herein in its entirety by reference, describes a family of resettable circuit interrupting devices capable of locking out the reset portion of the device if the circuit interrupting portion is non-operational or if an open neutral condition exists and capable of breaking electrical conductive paths independent of the operation of the circuit interrupting portion.

Some of the circuit interrupting devices described above have a user accessible load side connection in addition to the line and load side connections. The user accessible load side connection includes one or more connection points where a user can externally connect to electrical power supplied from the line side. The load side connection and user accessible load side connection are typically electrically connected together. An example of such a circuit interrupting device is a GFCI receptacle, where the line and load side connections are binding screws and the user accessible load side connection is the plug connection. As noted, such devices are connected to external wiring so that line wires are connected to the line side connection and load side wires are connected to the load side connection. However, instances may occur where the circuit interrupting device is improperly connected to the external wires so that the load wires are connected to the line side connection and the line wires are connected to the load connection. This is known as reverse wiring. In the event the circuit interrupting device is reverse wired, fault protection to the user accessible load connection may be eliminated, even if fault protection to the load side connection remains.

SUMMARY

The present application relates to a family of resettable circuit interrupting devices that maintains fault protection for the circuit interrupting device even if the device is reverse wired.

In one embodiment, the circuit interrupting device includes a housing and phase and neutral conductive paths disposed at least partially within the housing between line and load sides. Preferably, the phase conductive path terminates at a first connection capable of being electrically connected to a source of electricity, a second connection capable of conducting electricity to at least one load and a third connection capable of conducting electricity to at least one user accessible load. Similarly, the neutral conductive path, preferably, terminates at a first connection capable of being electrically connected to a source of electricity, a second connection capable of providing a neutral connection to the at least one load and a third connection capable of providing a neutral connection to the at least one user accessible load;

The circuit interrupting device also includes a circuit interrupting portion that is disposed within the housing and configured to cause electrical discontinuity in one or both of the phase and neutral conductive paths, between said line side and said load side upon the occurrence of a predetermined condition. A reset portion is disposed at least partially within the housing and is configured to reestablish electrical continuity in the open conductive paths.

Preferably, the phase conductive path includes a plurality of contacts that are capable of opening to cause electrical discontinuity in the phase conductive path and closing to reestablish electrical continuity in the phase conductive path, between said line and load sides. The neutral conductive path also includes a plurality of contacts that are capable of opening to cause electrical discontinuity in the neutral conductive path and closing to reestablish electrical continuity in the neutral conductive path, between said line and load sides. In this configuration, the circuit interrupting portion causes the plurality of contacts of the phase and neutral conductive paths to open, and the reset portion causes the plurality of contacts of the phase and neutral conductive paths to close.

One embodiment for the circuit interrupting portion uses an electro-mechanical circuit interrupter to cause electrical discontinuity in the phase and neutral conductive paths, and sensing circuitry to sense the occurrence of the predetermined condition. For example, the electro-mechanical circuit interrupter include a coil assembly, a movable plunger attached to the coil assembly and a banger attached to the plunger. The movable plunger is responsive to energizing of the coil assembly, and movement of the plunger is translated to movement of said banger. Movement of the banger causes the electrical discontinuity in the phase and/or neutral conductive paths.

The circuit interrupting device may also include reset lockout portion that prevents the reestablishing of electrical continuity in either the phase or neutral conductive path or both conductive paths, unless the circuit interrupting portion is operating properly. That is, the reset lockout prevents resetting of the device unless the circuit interrupting portion is operating properly. In embodiments where the circuit interrupting device includes a reset lockout portion, the reset portion may be configured so that at least one reset contact is electrically connected to the sensing circuitry of the circuit interrupting portion, and that depression of a reset button causes at least a portion of the phase conductive path to contact at least one reset contact. When contact is made between the phase conductive path and the at least one reset contact, the circuit interrupting portion is activated so that the reset lockout portion is disabled and electrical continuity in the phase and neutral conductive paths can be reestablished.

The circuit interrupting device may also include a trip portion that operates independently of the circuit interrupting portion. The trip portion is disposed at least partially within the housing and is configured to cause electrical discontinuity in the phase and/or neutral conductive paths independent of the operation of the circuit interrupting portion. In one embodiment, the trip portion includes a trip actuator accessible from an exterior of the housing and a trip arm preferably within the housing and extending from the trip actuator. The trip arm is preferably configured to facilitate mechanical breaking of electrical continuity in the phase and/or neutral conductive paths, if the trip actuator is actuated. Preferably, the trip actuator is a button. However, other known actuators are also contemplated.

BRIEF DESCRIPTION OF THE DRAWINGS

Preferred embodiments of the present application are described herein with reference to the drawings in which similar elements are given similar reference characters, wherein.

DETAILED DESCRIPTION

Figure 1:
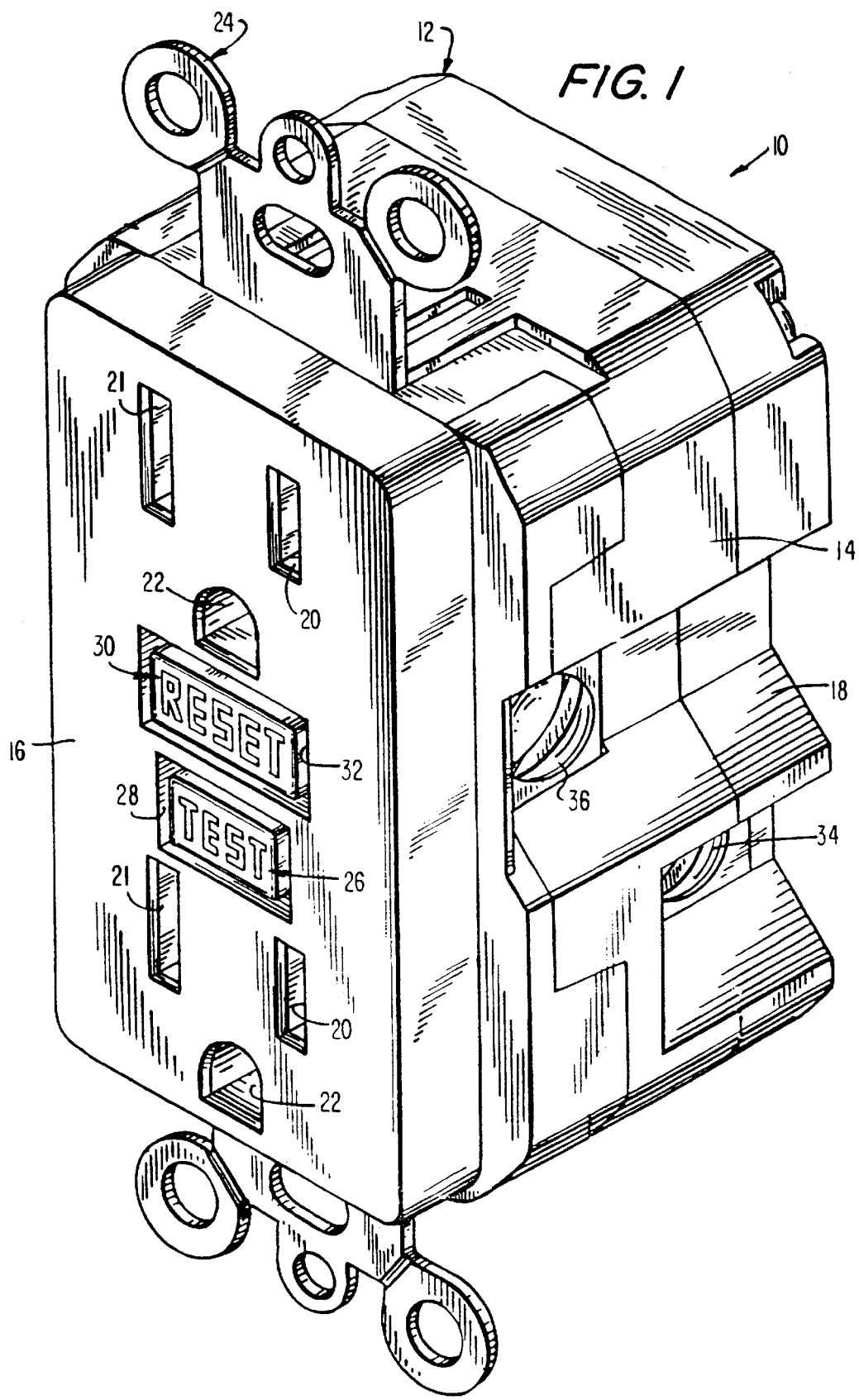
FIG. 1 is a perspective view of one embodiment of a ground fault circuit interrupting device according to the present application.

The present application contemplates various types of circuit interrupting devices that are capable of breaking at least one conductive path at both a line side and a load side of the device. The conductive path is typically divided between a line side that connects to supplied electrical power and a load side that connects to one or more loads. As noted, the various devices in the family of resettable circuit interrupting devices include: ground fault circuit interrupters (GFCI's), arc fault circuit interrupters (AFCI's), immersion detection circuit interrupters (IDCI's), appliance leakage circuit interrupters (ALCI's) and equipment leakage circuit interrupters (ELCI's).

For the purpose of the present application, the structure or mechanisms used in the circuit interrupting devices, shown in the drawings and described hereinbelow, are incorporated into a GFCI receptacle suitable for installation in a single-gang junction box used in, for example, a residential electrical wiring system. However, the mechanisms according to the present application can be included in any of the various devices in the family of resettable circuit interrupting devices.

The GFCI receptacles described herein have line and load phase (or power) connections, line and load neutral connections and user accessible load phase and neutral connections. The connections permit external conductors or appliances to be connected to the device. These connections may be, for example, electrical fastening devices that secure or connect external conductors to the circuit interrupting device, as well as conduct electricity. Examples of such connections include binding screws, lugs, terminals and external plug connections.

In one embodiment, the GFCI receptacle has a circuit interrupting portion, a reset portion and a reset lockout. This embodiment is shown in FIGS. 1–12. In another embodiment, the GFCI receptacle is similar to the embodiment of FIGS. 1–12, except the reset lockout is omitted. Thus, in this embodiment, the GFCI receptacle has a circuit interrupting portion and a reset portion, which is similar to those described in FIGS. 1–12. In another embodiment, the GFCI receptacle has a circuit interrupting portion, a reset portion, a reset lockout and an independent trip portion. This embodiment is shown in FIGS. 13–20.

The circuit interrupting and reset portions described herein preferably use electromechanical components to break (open) and make (close) one or more conductive paths between the line and load sides of the device. However, electrical components, such as solid state switches and supporting circuitry, may be used to open and close the conductive paths.

Generally, the circuit interrupting portion is used to automatically break electrical continuity in one or more conductive paths (i.e., open the conductive path) between the line and load sides upon the detection of a fault, which in the embodiments described is a ground fault. The reset portion is used to close the open conductive paths.

In the embodiments including a reset lockout, the reset portion is used to disable the reset lockout, in addition to closing the open conductive paths. In this configuration, the operation of the reset and reset lockout portions is in conjunction with the operation of the circuit interrupting portion, so that electrical continuity in open conductive paths cannot be reset if the circuit interrupting portion is nonoperational, if an open neutral condition exists and/or if the device is reverse wired.

In the embodiments including an independent trip portion, electrical continuity in one or more conductive paths can be broken independently of the operation of the circuit interrupting portion. Thus, in the event the circuit interrupting portion is not operating properly, the device can still be tripped.

The above-described features can be incorporated in any resettable circuit interrupting device, but for simplicity the descriptions herein are directed to GFCI receptacles.

Turning now to FIG. 1, the GFCI receptacle 10 has a housing 12 consisting of a relatively central body 14 to which a face or cover portion 16 and a rear portion 18 are removably secured. The face portion 16 has entry ports 20 and 21 for receiving normal or polarized prongs of a male plug of the type normally found at the end of a lamp or appliance cord set (not shown), as well as ground-prong-receiving openings 22 to accommodate a three-wire plug. The receptacle also includes a mounting strap 24 used to fasten the receptacle to a junction box.

A test button 26 extends through opening 28 in the face portion 16 of the housing 12. The test button is used to activate a test operation, that tests the operation of the circuit interrupting portion (or circuit interrupter) disposed in the device. The circuit interrupting portion, to be described in more detail below, is used to break electrical continuity in one or more conductive paths between the line and load side of the device. A reset button 30 forming a part of the reset portion extends through opening 32 in the face portion 16 of the housing 12. The reset button is used to activate a reset operation, which reestablishes electrical continuity in the open conductive paths.

Electrical connections to existing household electrical wiring are made via binding screws 34 and 36, where screw 34 is an input (or line) phase connection, and screw 36 is an output (or load) phase connection. It should be noted that two additional binding screws 38 and 40 (seen in FIG. 3) are located on the opposite side of the receptacle 10. These additional binding screws provide line and load neutral connections, respectively. A more detailed description of a GFCI receptacle is provided in U.S. Pat. No. 4,595,894, which is incorporated herein in its entirety by reference. It should also be noted that binding screws 34, 36, 38 and 40 are exemplary of the types of wiring terminals that can be used to provide the electrical connections. Examples of other types of wiring terminals include set screws, pressure clamps, pressure plates, push-in type connections, pigtails and quick-connect tabs.

Referring to FIGS. 2–6, the conductive path between the line phase connection 34 and the load phase connection 36 includes contact arm 50 which is movable between stressed and unstressed positions, movable contact 52 mounted to the contact arm 50, contact arm 54 secured to or monolithically formed into the load phase connection 36 and fixed contact 56 mounted to the contact arm 54. The user accessible load phase connection for this embodiment includes terminal assembly 58 having two binding terminals 60 which are capable of engaging a prong of a male plug inserted therebetween. The conductive path between the line phase connection 34 and the user accessible load phase connection includes, contact arm 50, movable contact 62 mounted to contact arm 50, contact arm 64 secured to or monolithically formed into terminal assembly 58, and fixed contact 66 mounted to contact arm 64. These conductive paths are collectively called the phase conductive path.

Similarly, the conductive path between the line neutral connection 38 and the load neutral connection 40 includes, contact arm 70 which is movable between stressed and unstressed positions, movable contact 72 mounted to contact arm 70, contact arm 74 secured to or monolithically formed into load neutral connection 40, and fixed contact 76 mounted to the contact arm 74. The user accessible load neutral connection for this embodiment includes terminal assembly 78 having two binding terminals 80 which are capable of engaging a prong of a male plug inserted therebetween. The conductive path between the line neutral connection 38 and the user accessible load neutral connection includes, contact arm 70, movable contact 82 mounted to the contact arm 70, contact arm 84 secured to or mono-lithically formed into terminal assembly 78, and fixed contact 86 mounted to contact arm 84. These conductive paths are collectively called the neutral conductive path.

Figure 2:
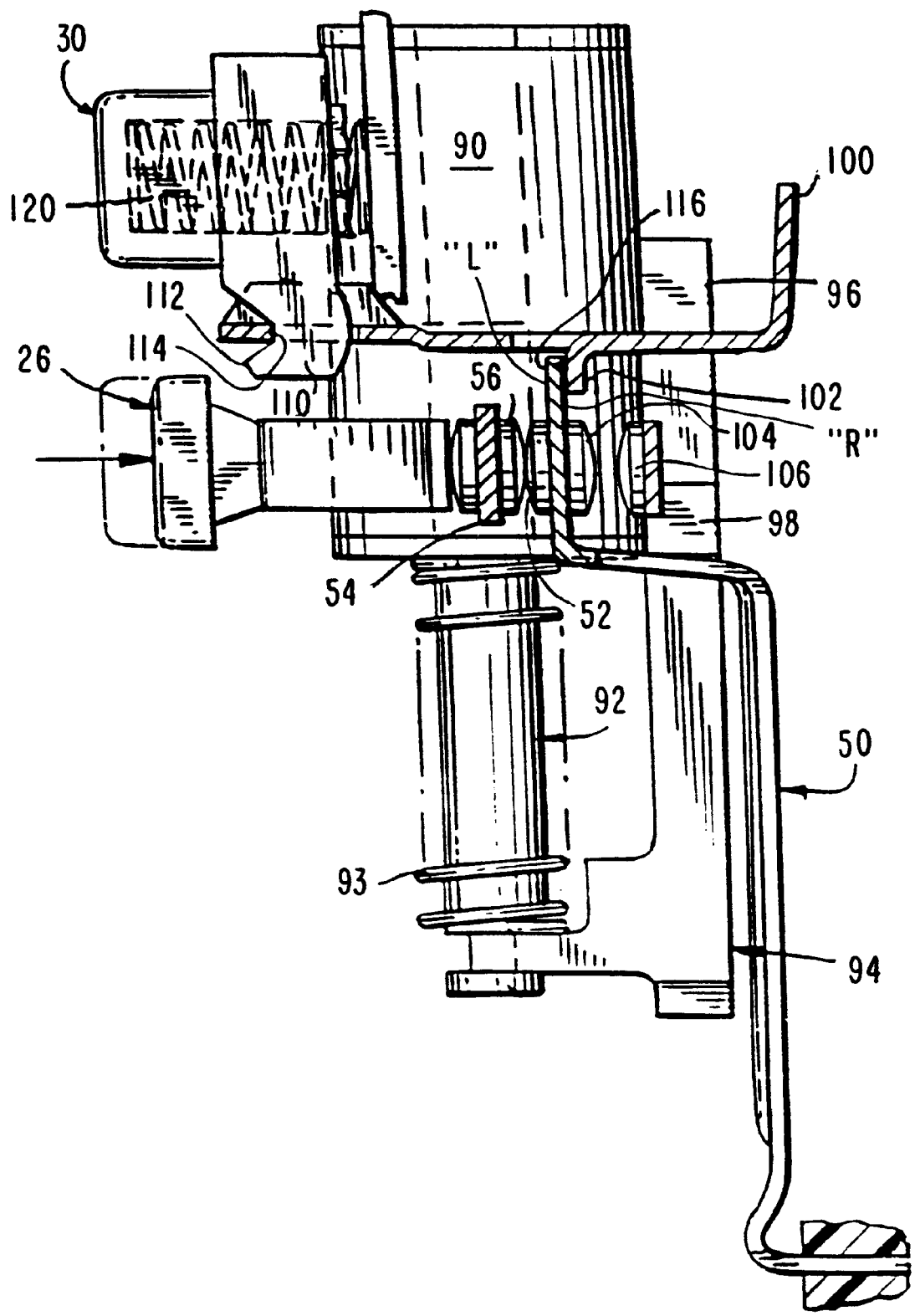
FIG. 2 is side elevational view, partly in section, of a portion of the GFCI device shown in FIG. 1, illustrating the GFCI device in a set or circuit making position.
Figure 12:
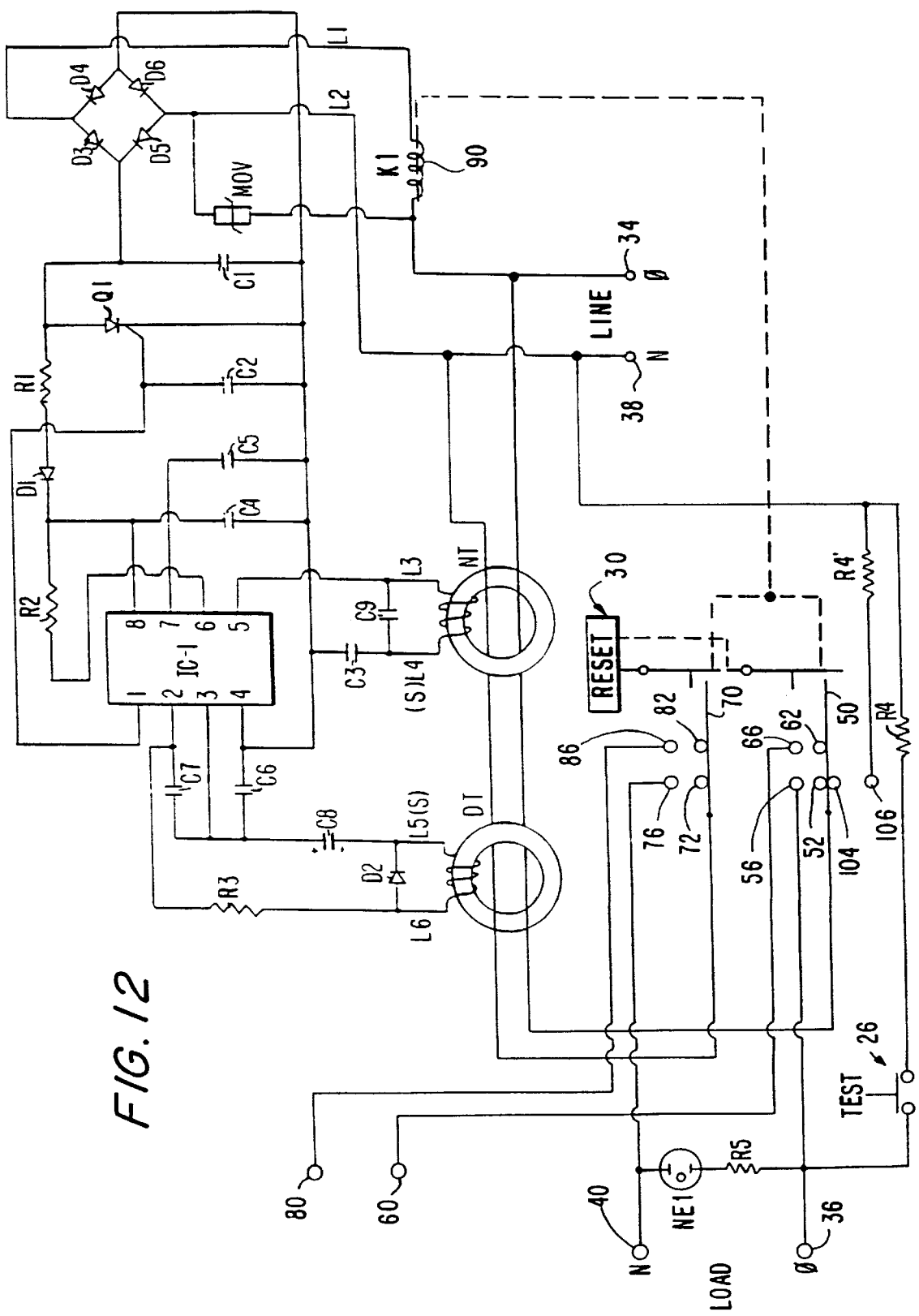
FIG. 12 is a schematic diagram of a circuit for detecting ground faults and resetting the GFCI device of FIG. 1.

Referring to FIG. 2, the circuit interrupting portion has a circuit interrupter and electronic circuitry capable of sensing faults, e.g., current imbalances, on the hot and/or neutral conductors. In a preferred embodiment for the GFCI receptacle, the circuit interrupter includes a coil assembly 90, a plunger 92 responsive to the energizing and de-energizing of the coil assembly and a banger 94 connected to the plunger 92. The banger 94 has a pair of banger dogs 96 and 98 which interact with a movable latching members 100 used to set and reset electrical continuity in one or more conductive paths. The coil assembly 90 is activated in response to the sensing of a ground fault by, for example, the sense circuitry shown in FIG. 12. FIG. 12 shows conventional circuitry for detecting ground faults that includes a differential transformer that senses current imbalances.

The reset portion includes reset button 30, the movable latching members 100 connected to the reset button 30, latching fingers 102 and reset contacts 104 and 106 that temporarily activate the circuit interrupting portion when the reset button is depressed, when in the tripped position. Preferably, the reset contacts 104 and 106 are normally open momentary contacts. The latching fingers 102 are used to engage side R of each contact arm 50,70 and move the arms 50,70 back to the stressed position where contacts 52,62 touch contacts 56,66, respectively, and where contacts 72,82 touch contacts 76,86, respectively.

The movable latching members 102 are, in this embodiment, common to each portion (i.e., the circuit interrupting, reset and reset lockout portions) and used to facilitate making, breaking or locking out of electrical continuity of one or more of the conductive paths. However, the circuit interrupting devices according to the present application also contemplate embodiments where there is no common mechanism or member between each portion or between certain portions. Further, the present application also contemplates using circuit interrupting devices that have circuit interrupting, reset and reset lockout portions to facilitate making, breaking or locking out of the electrical continuity of one or both of the phase or neutral conductive paths.

Figure 3:
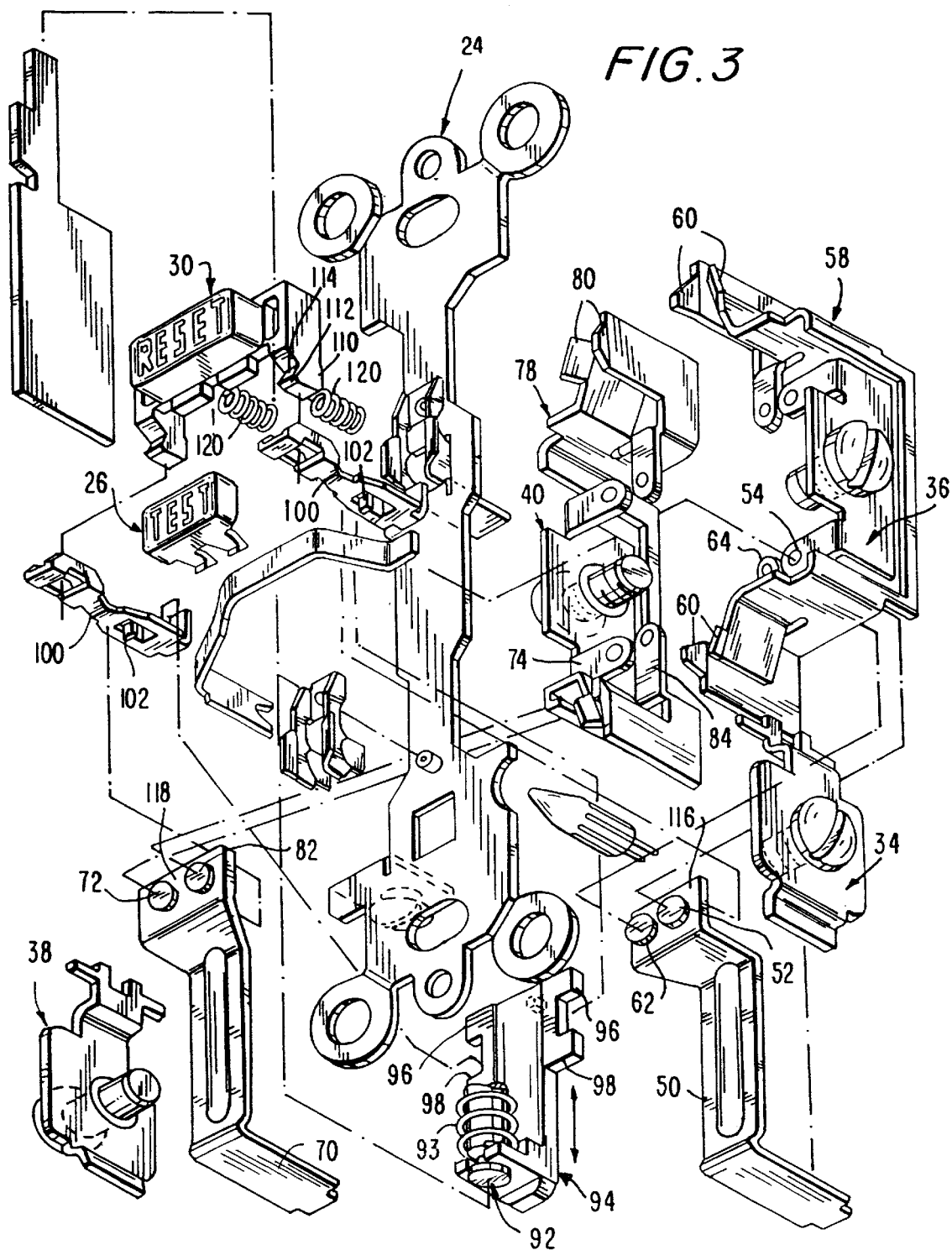
FIG. 3 is an exploded view of internal components of the circuit interrupting device of FIG. 1.

In the embodiment shown in FIGS. 2 and 3, the reset lockout portion includes latching fingers 102 which after the device is tripped, engages side L of the movable arms 50,70 so as to block the movable arms 50,70 from moving. By blocking movement of the movable arms 50,70, contacts 52 and 56, contacts 62 and 66, contacts 72 and 76 and contacts 82 and 86 are prevented from touching. Alternatively, only one of the movable arms 50 or 70 may be blocked so that their respective contacts are prevented from touching. Further, in this embodiment, latching fingers 102 act as an active inhibitor that prevents the contacts from touching. Alternatively, the natural bias of movable arms 50 and 70 can be used as a passive inhibitor that prevents the contacts from touching.

Referring now to FIGS. 2 and 7–11, the mechanical components of the circuit interrupting and reset portions in various stages of operation are shown. For this part of the description, the operation will be described only for the phase conductive path, but the operation is similar for the neutral conductive path, if it is desired to open and close both conductive paths. In FIG. 2, the GFCI receptacle is shown in a set position where movable contact arm 50 is in a stressed condition so that movable contact 52 is in electrical engagement with fixed contact 56 of contact arm 54. If the sensing circuitry of the GFCI receptacle senses a ground fault, the coil assembly 90 is energized to draw plunger 92 into the coil assembly 90 so that banger 94 moves upwardly. As the banger moves upwardly, the banger front dog 98 strikes the latch member 100 causing it to pivot in a counterclockwise direction C (seen in FIG. 7) about the joint created by the top edge 112 and inner surface 114 of finger 110. The movement of the latch member 100 removes the latching finger 102 from engagement with side R of the remote end 116 of the movable contact arm 50, and permits the contact arm 50 to return to its pre-stressed condition opening contacts 52 and 56, seen in FIG. 7.

Figure 10:
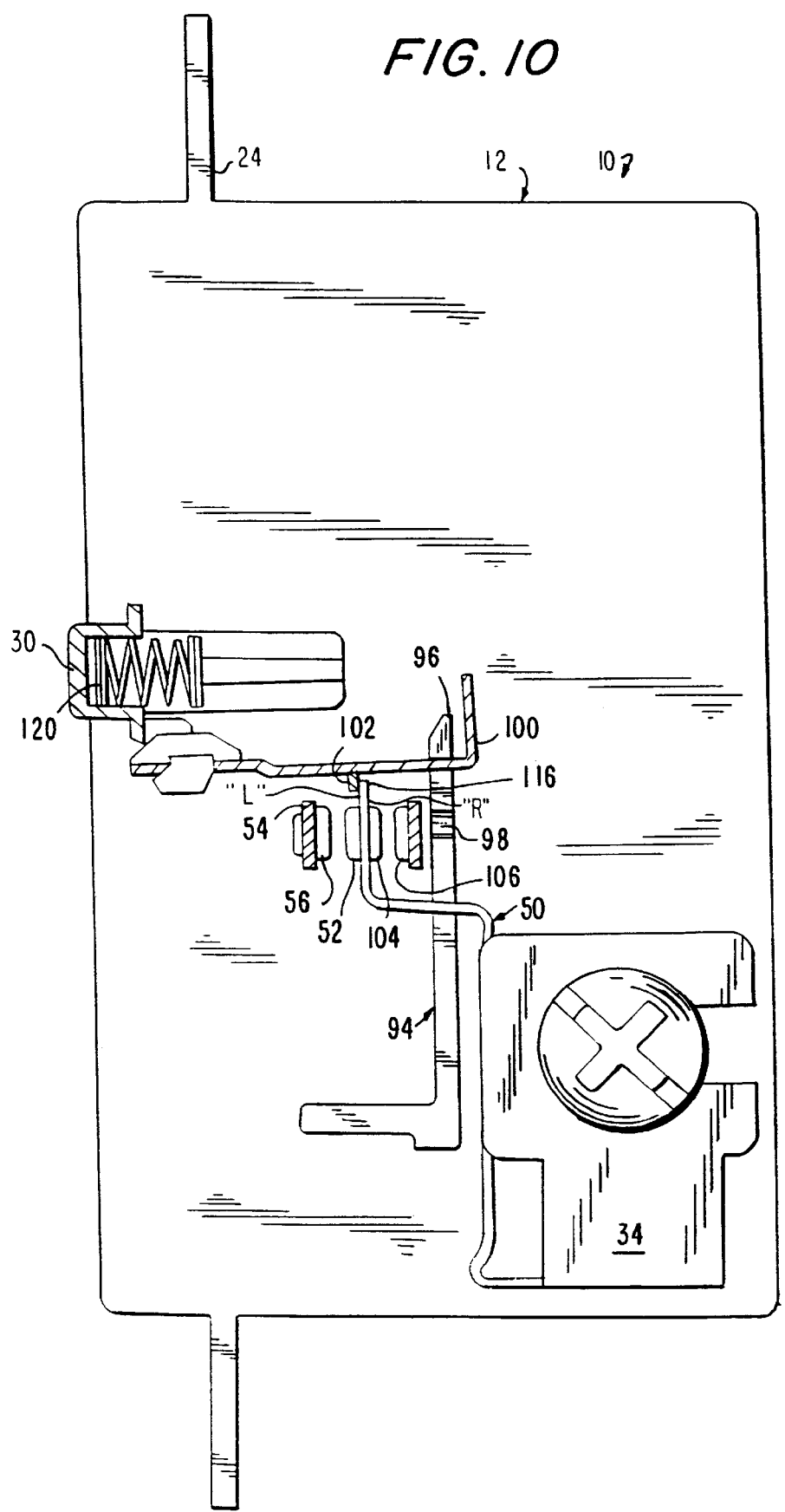

After tripping, the coil assembly 90 is de-energized so that spring 93 returns plunger 92 to its original extended position and banger 94 moves to its original position releasing latch member 100. At this time, the latch member 100 is in a lockout position where latch finger 102 inhibits movable contact 52 from engaging fixed contact 56, as seen in FIG. 10. As noted, one or both latching fingers 102 can act as an active inhibitor that prevents the contacts from touching. Alternatively, the natural bias of movable arms 50 and 70 can be used as a passive inhibitor that prevents the contacts from touching.

Figure 7:
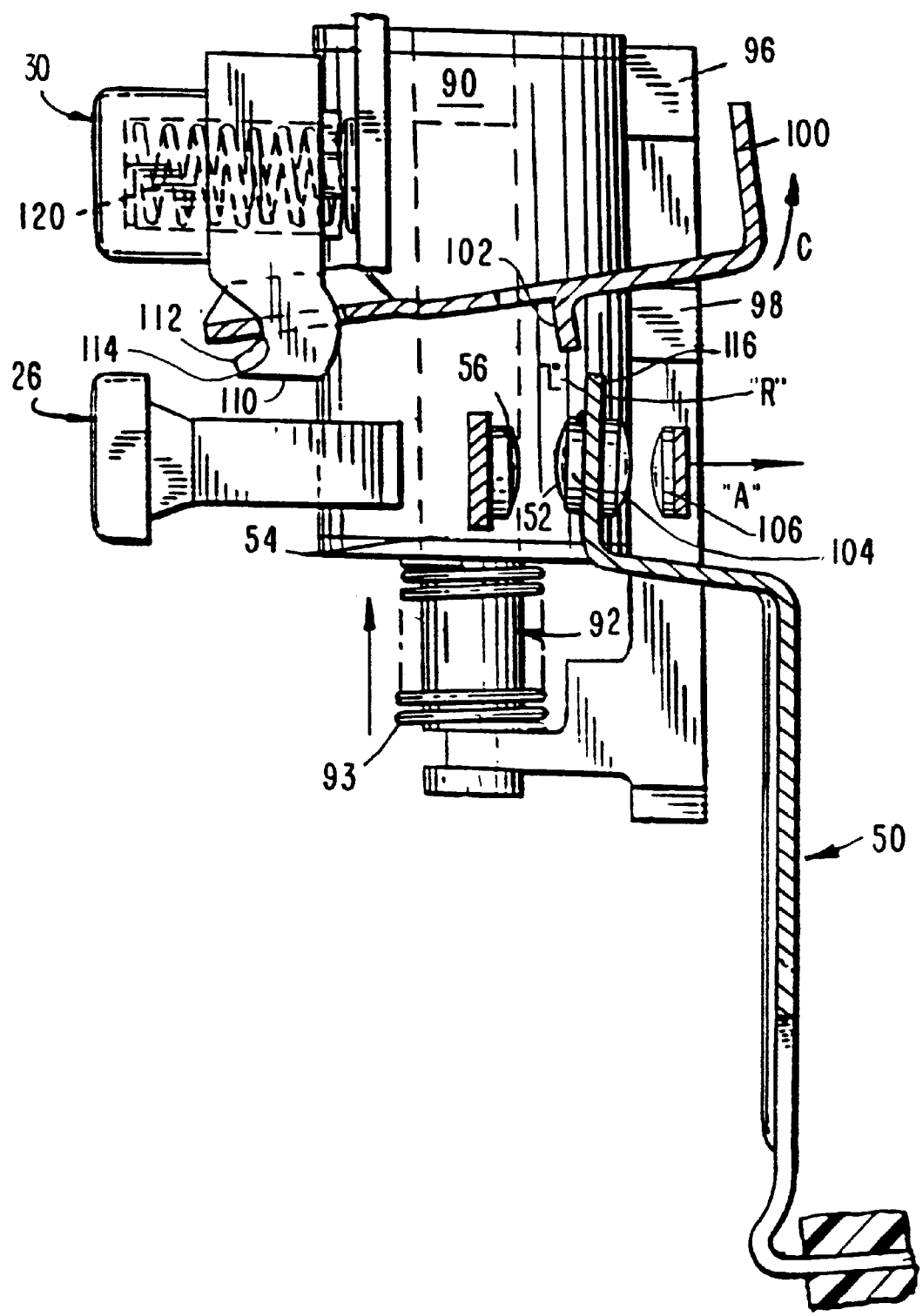
FIG. 7 is a side elevational view similar to FIG. 2, illustrating the GFCI device in a circuit breaking or interrupting position.
Figure 8:
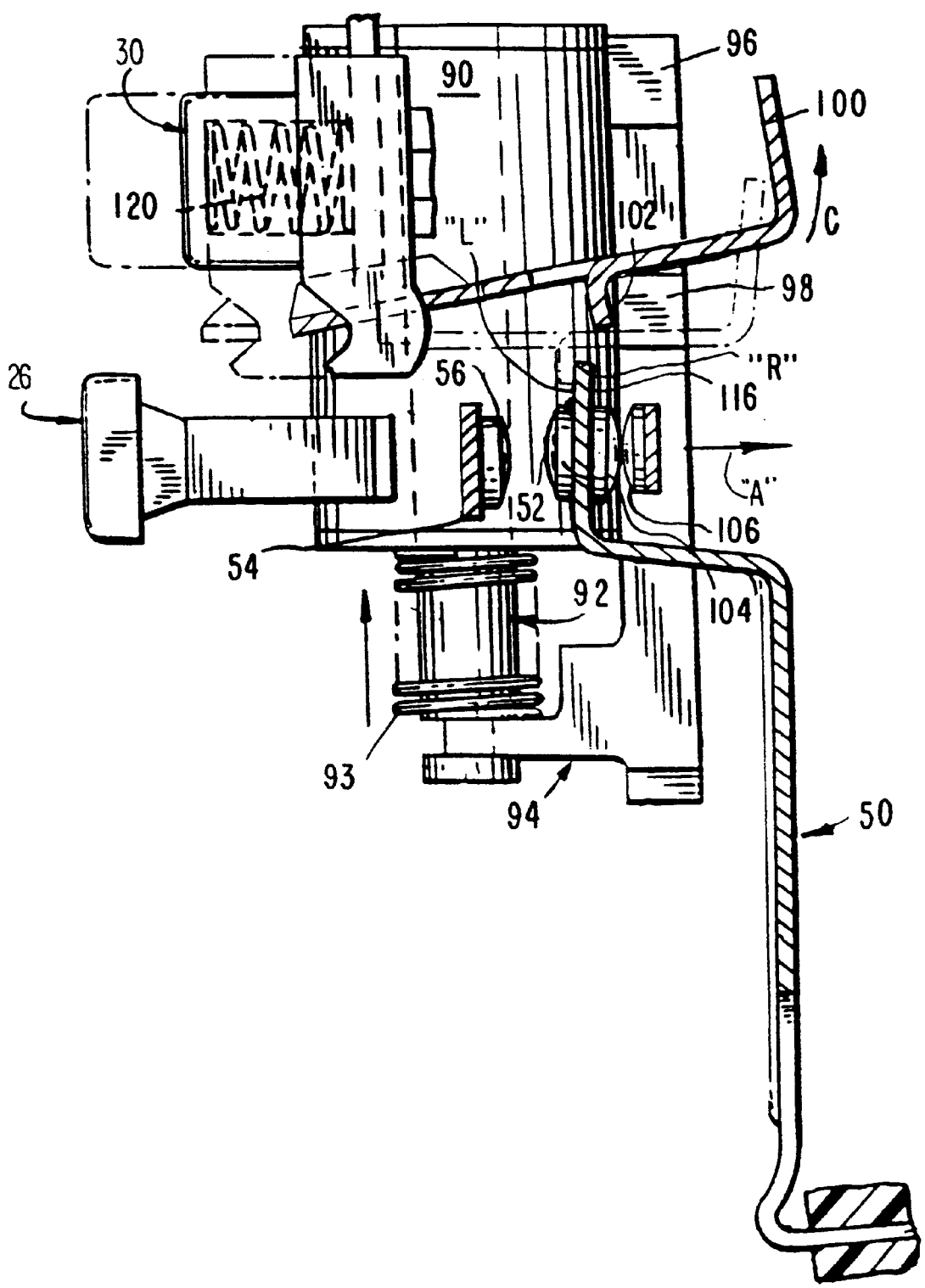
FIG. 8 is a side elevational view similar to FIG. 2, illustrating the components of the GFCI device during a reset operation.
Figure 11:
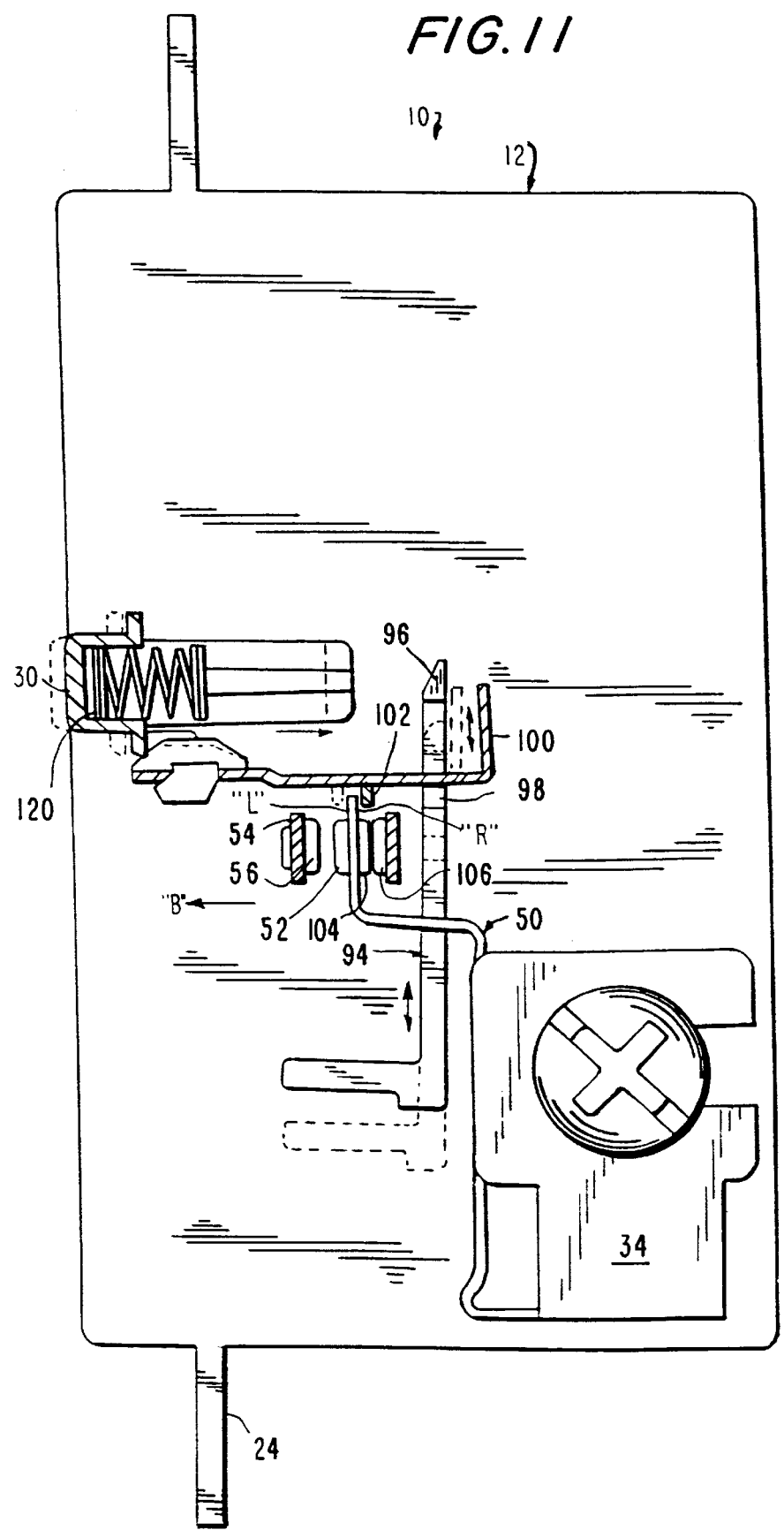

To reset the GFCI receptacle so that contacts 52 and 56 are closed and continuity in the phase conductive path is reestablished, the reset button 30 is depressed sufficiently to overcome the bias force of return spring 120 and move the latch member 100 in the direction of arrow A, seen in FIG. 8. While the reset button 30 is being depressed, latch finger 102 contacts side L of the movable contact arm 50 and continued depression of the reset button 30 forces the latch member to overcome the stress force exerted by the arm 50 causing the reset contact 104 on the arm 50 to close on reset contact 106. Closing the reset contacts activates the operation of the circuit interrupter by, for example simulating a fault, so that plunger 92 moves the banger 94 upwardly striking the latch member 100 which pivots the latch finger 102, while the latch member 100 continues to move in the direction of arrow A. As a result, the latch finger 102 is lifted over side L of the remote end 116 of the movable contact arm 50 onto side R of the remote end of the movable contact arm, as seen in FIGS. 7 and 11. Contact arm 50 returns to its unstressed position, opening contacts 52 and 56 and contacts 62 and 66, so as to terminate the activation of the circuit interrupting portion, thereby de-energizing the coil assembly 90.

Figure 9:
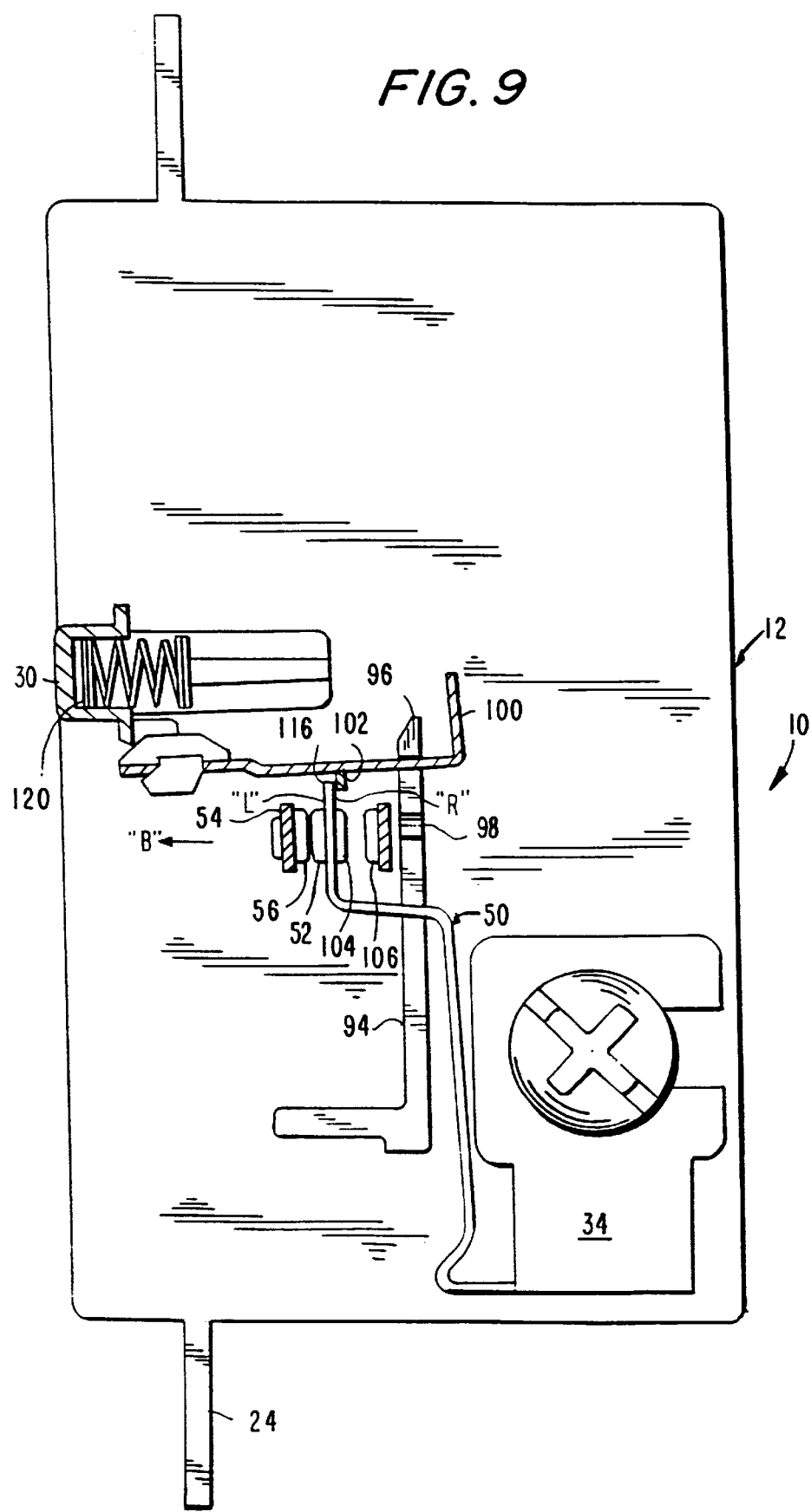
FIGS. 9–11 are schematic representations of the operation of one embodiment of the reset portion of the present application, illustrating a latching member used to make an electrical connection between line and load connections and to relate the reset portion of the electrical connection with the operation of the circuit interrupting portion.

After the circuit interrupter operation is activated, the coil assembly 90 is de-energized so that so that plunger 92 returns to its original extended position, and banger 94 releases the latch member 100 so that the latch finger 102 is in a reset position, seen din FIG. 9. Release of the reset button causes the latching member 100 and movable contact arm 50 to move in the direction of arrow B (seen in FIG. 9) until contact 52 electrically engages contact 56, as seen in FIG. 2.

As noted above, if opening and closing of electrical continuity in the neutral conductive path is desired, the above description for the phase conductive path is also applicable to the neutral conductive path.

In an alternative embodiment, the circuit interrupting devices may also include a trip portion that operates independently of the circuit interrupting portion so that in the event the circuit interrupting portion becomes non-operational the device can still be tripped. Preferably, the trip portion is manually activated and uses mechanical components to break one or more conductive paths. However, the trip portion may use electrical circuitry and/or electromechanical components to break either the phase or neutral conductive path or both paths.

For the purposes of the present application, the structure or mechanisms for this embodiment are also incorporated into a GFCI receptacle, seen in FIGS. 13–20, suitable for installation in a single-gang junction box in a home. However, the mechanisms according to the present application can be included in any of the various devices in the family of resettable circuit interrupting devices.

Figure 13:
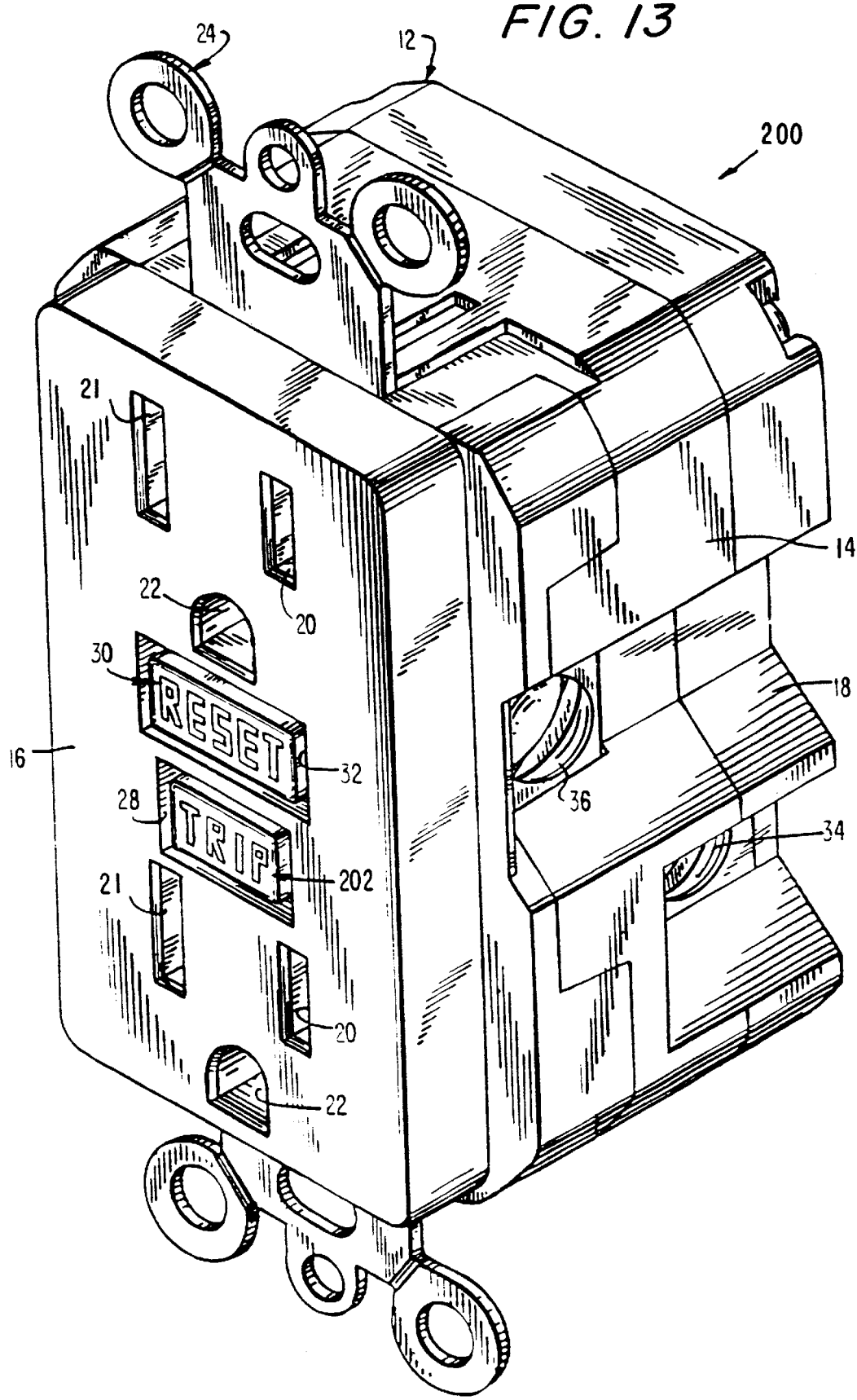
FIG. 13 is a perspective view of an alternative embodiment of a ground fault circuit interrupting device according to the present application.

Turning now to FIG. 13, the GFCI receptacle 200 according to this embodiment is similar to the GFCI receptacle described in FIGS. 1–12. Similar to FIG. 1, the GFCI receptacle 200 has a housing 12 consisting of a relatively central body 14 to which a face or cover portion 16 and a rear portion 18 are, preferably, removably secured.

A trip actuator 202, preferably a button, which is part of the trip portion to be described in more detail below, extends through opening 28 in the face portion 16 of the housing 12. The trip actuator is used, in this exemplary embodiment, to mechanically trip the GFCI receptacle, i.e., break electrical continuity in one or more of the conductive paths, independent of the operation of the circuit interrupting portion.

A reset actuator 30, preferably a button, which is part of the reset portion, extends through opening 32 in the face portion 16 of the housing 12. The reset button is used to activate the reset operation, which re-establishes electrical continuity in the open conductive paths, i.e., resets the device, if the circuit interrupting portion is operational.

As in the above embodiment, electrical connections to existing household electrical wiring are made via binding screws 34 and 36, where screw 34 is an input (or line) phase connection, and screw 36 is an output (or load) phase connection. It should be noted that two additional binding screws 38 and 40 (seen in FIG. 3) are located on the opposite side of the receptacle 200. These additional binding screws provide line and load neutral connections, respectively. A more detailed description of a GFCI receptacle is provided in U.S. Pat. No. 4,595,894, which is incorporated herein in its entirety by reference.

Referring to FIGS. 4–6, 14 and 17, the conductive paths in this embodiment are substantially the same as those described above. The conductive path between the line phase connection 34 and the load phase connection 36 includes, contact arm 50 which is movable between stressed and unstressed positions, movable contact 52 mounted to the contact arm 50, contact arm 54 secured to or monolithically formed into the load phase connection 36 and fixed contact 56 mounted to the contact arm 54 (seen in FIGS. 4, 5 and 17). The user accessible load phase connection for this embodiment includes terminal assembly 58 having two binding terminals 60 which are capable of engaging a prong of a male plug inserted therebetween. The conductive path between the line phase connection 34 and the user accessible load phase connection includes, contact arm 50, movable contact 62 mounted to contact arm 50, contact arm 64 secured to or monolithically formed into terminal assembly 58, and fixed contact 66 mounted to contact arm 64. These conductive paths are collectively called the phase conductive path.

Figure 4:
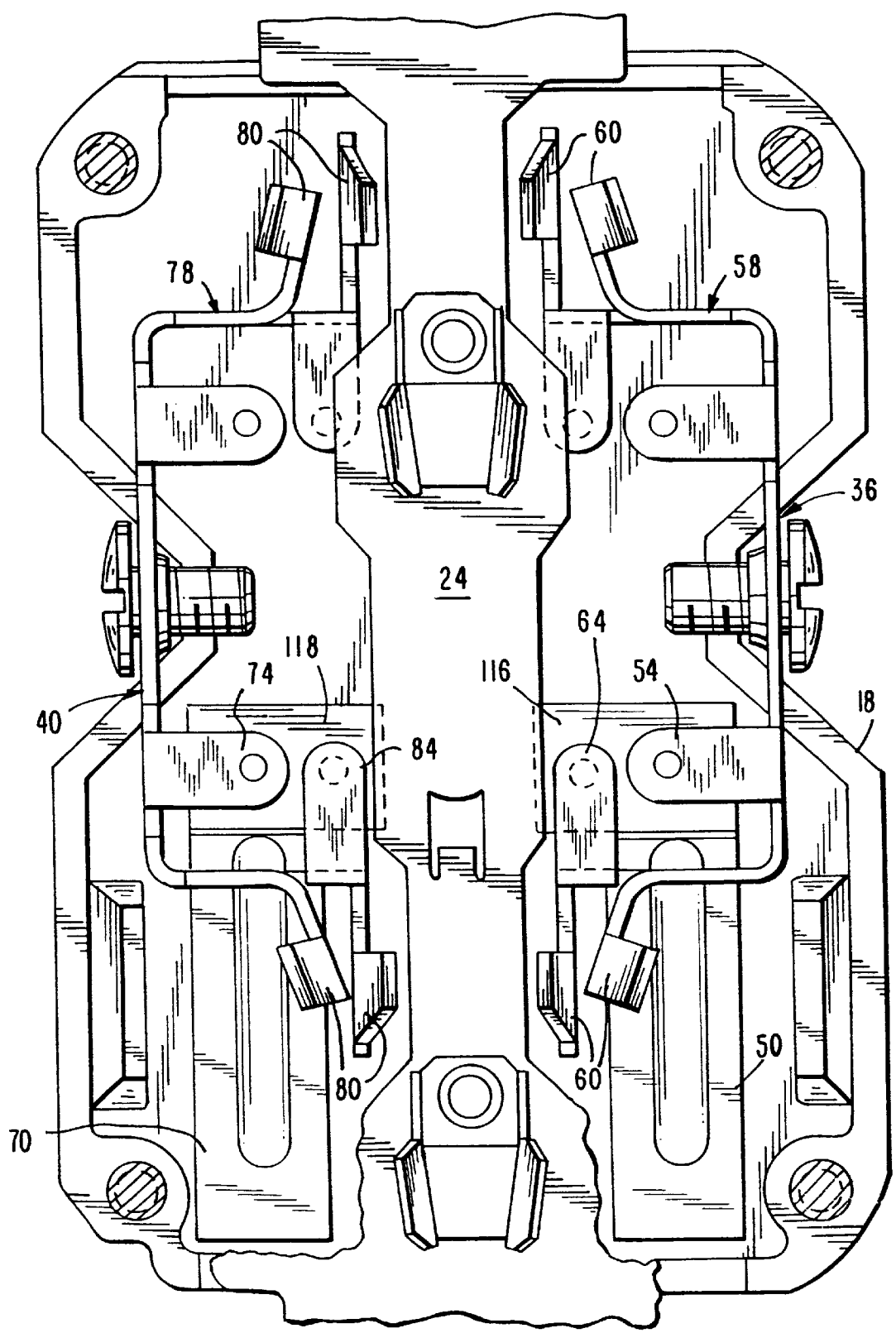
FIG. 4 is a plan view of portions of electrical conductive paths located within the GFCI device of FIG. 1.
Figure 5:
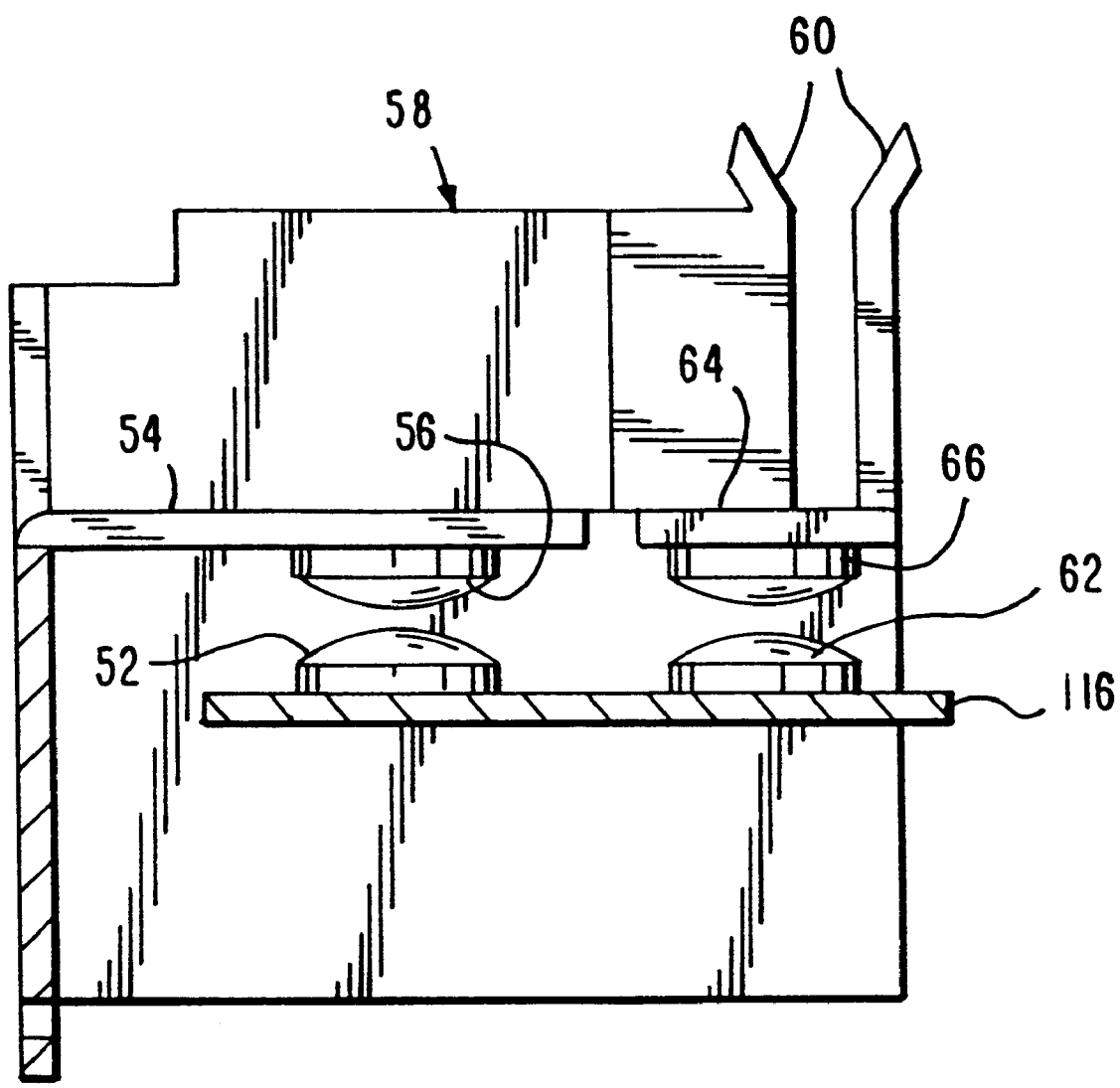
FIG. 5 is a partial sectional view of a portion of a conductive path shown in FIG. 4.
Figure 6:
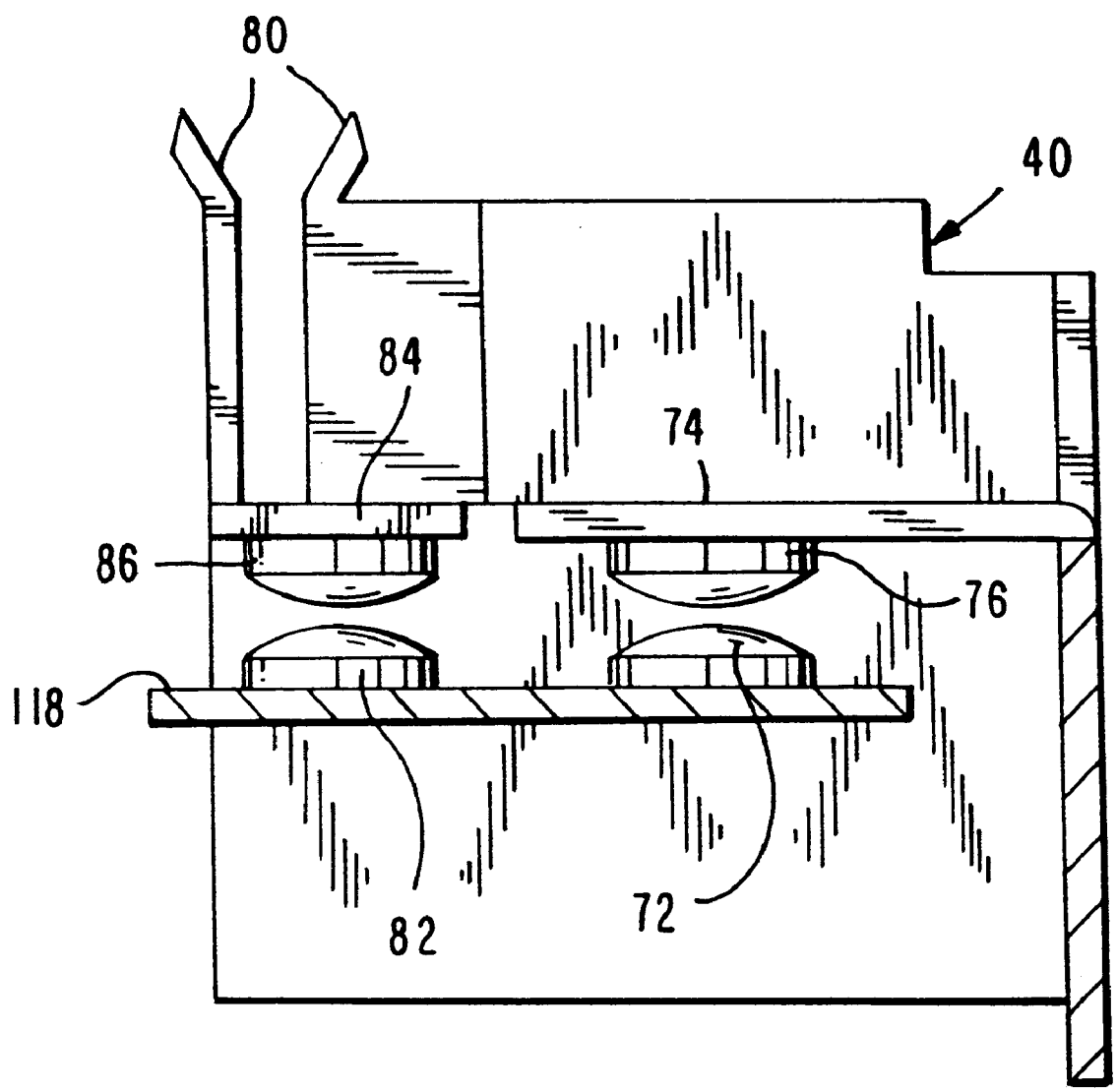
FIG. 6 is a partial sectional view of a portion of a conductive path shown in FIG. 4.
Figure 17:
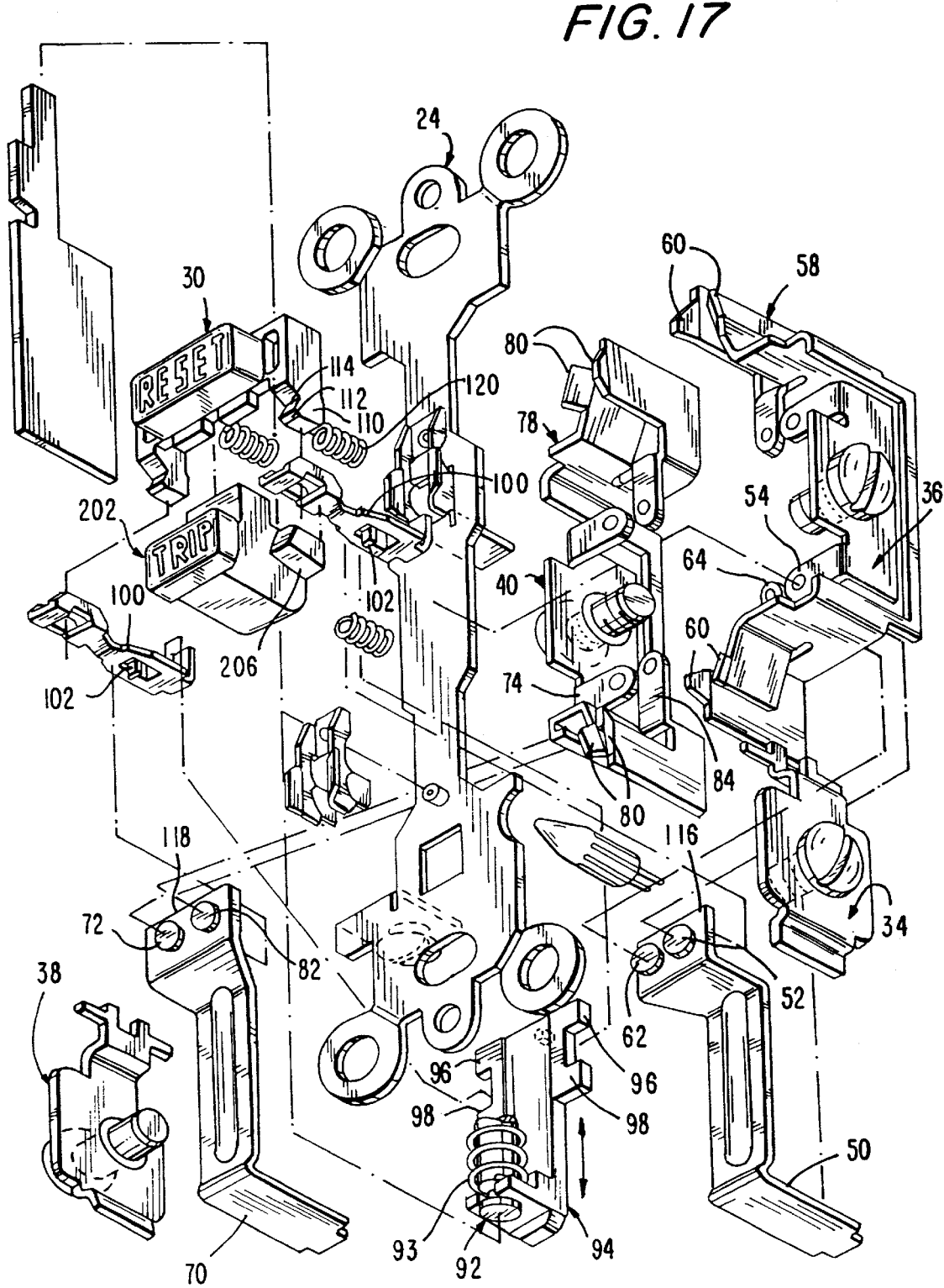
FIG. 17 is an exploded view of internal components of the GFCI device of FIG. 13.

Similarly, the conductive path between the line neutral connection 38 and the load neutral connection 40 includes, contact arm 70 which is movable between stressed and unstressed positions, movable contact 72 mounted to contact arm 70, contact arm 74 secured to or monolithically formed into load neutral connection 40, and fixed contact 76 mounted to the contact arm 74 (seen in FIGS. 4, 6 and 17). The user accessible load neutral connection for this embodiment includes terminal assembly 78 having two binding terminals 80 which are capable of engaging a prong of a male plug inserted therebetween. The conductive path between the line neutral connection 38 and the user accessible load neutral connection includes, contact arm 70, movable contact 82 mounted to the contact arm 70, contact arm 84 secured to or monolithically formed into terminal assembly 78, and fixed contact 86 mounted to contact arm 84. These conductive paths are collectively called the neutral conductive path.

Figure 14:
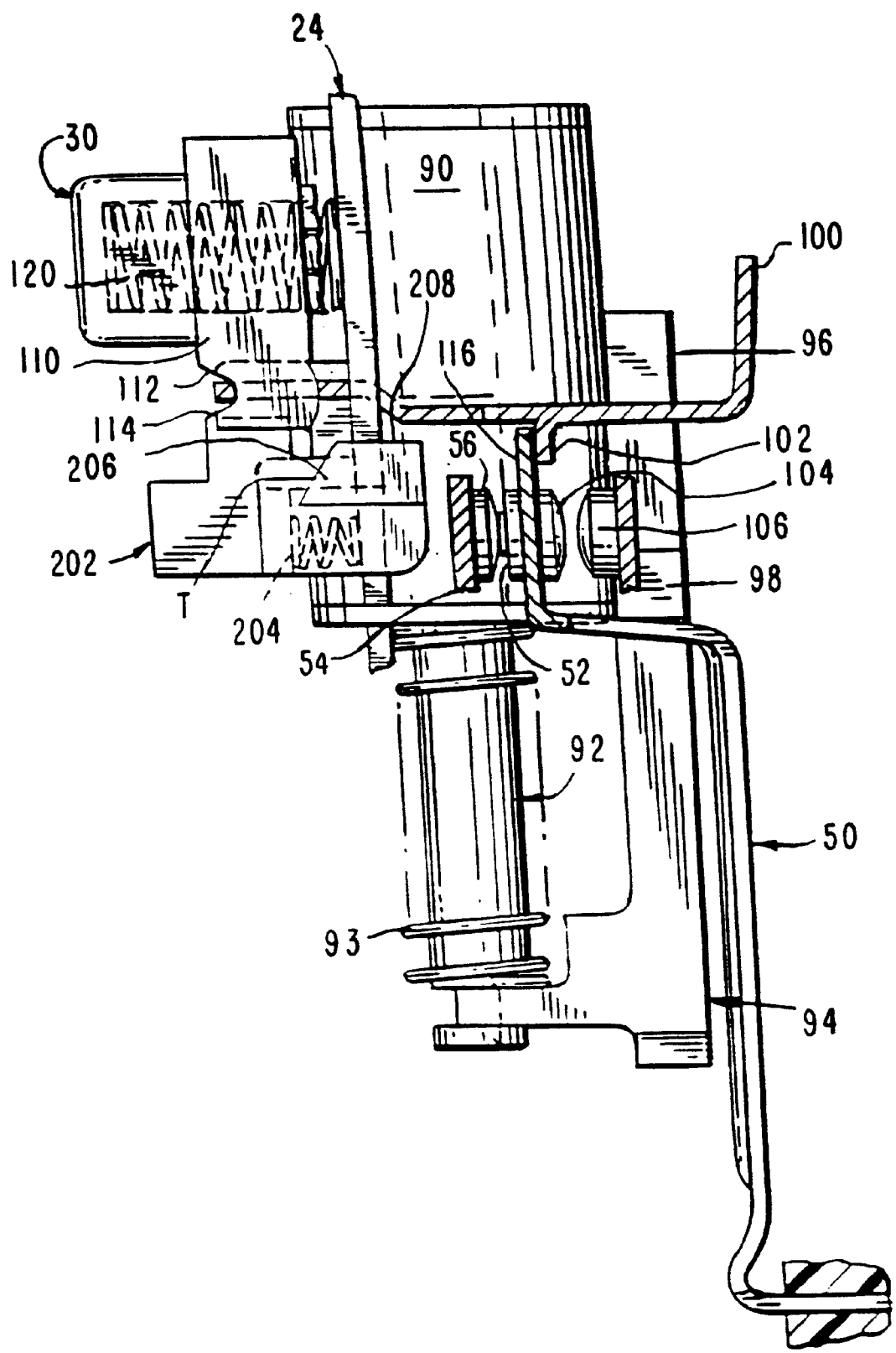
FIG. 14 is side elevational view, partly in section, of a portion of the GFCI device shown in FIG. 13, illustrating the GFCI device in a set or circuit making position.

There is also shown in FIG. 14, mechanical components used during circuit interrupting and reset operations according to this embodiment of the present application. Although these components shown in the drawings are electromechanical in nature, the present application also contemplates using semiconductor type circuit interrupting and reset components, as well as other mechanisms capable of making and breaking electrical continuity.

The circuit interrupting device according to this embodiment incorporates an independent trip portion into the circuit interrupting device of FIGS. 1–12. Therefore, a description of the circuit interrupting, reset and reset lockout portions are omitted.

Figure 15:
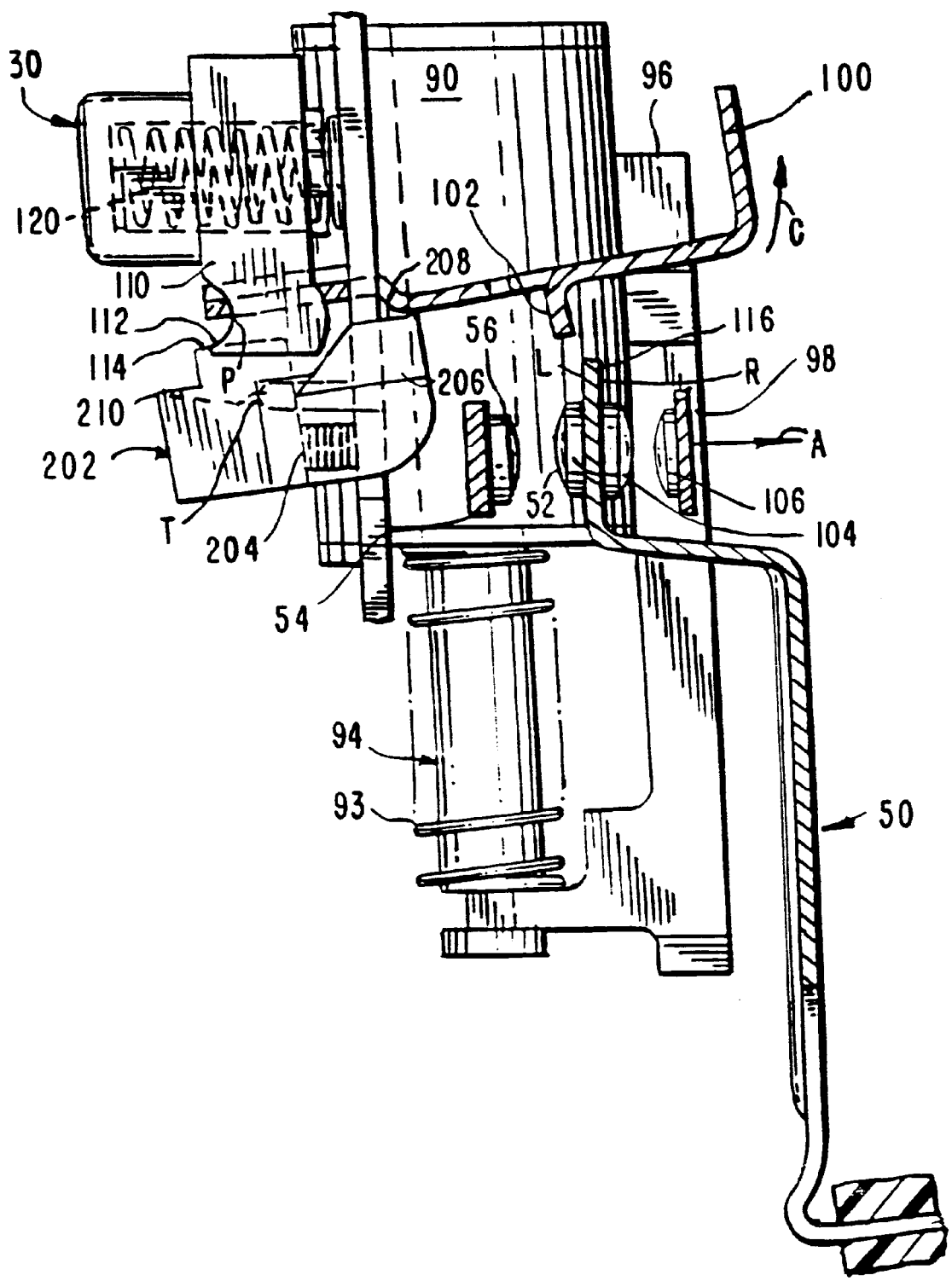
FIG. 15 is a side elevational view similar to FIG. 14, illustrating the GFCI device in a circuit breaking position.
Figure 16:
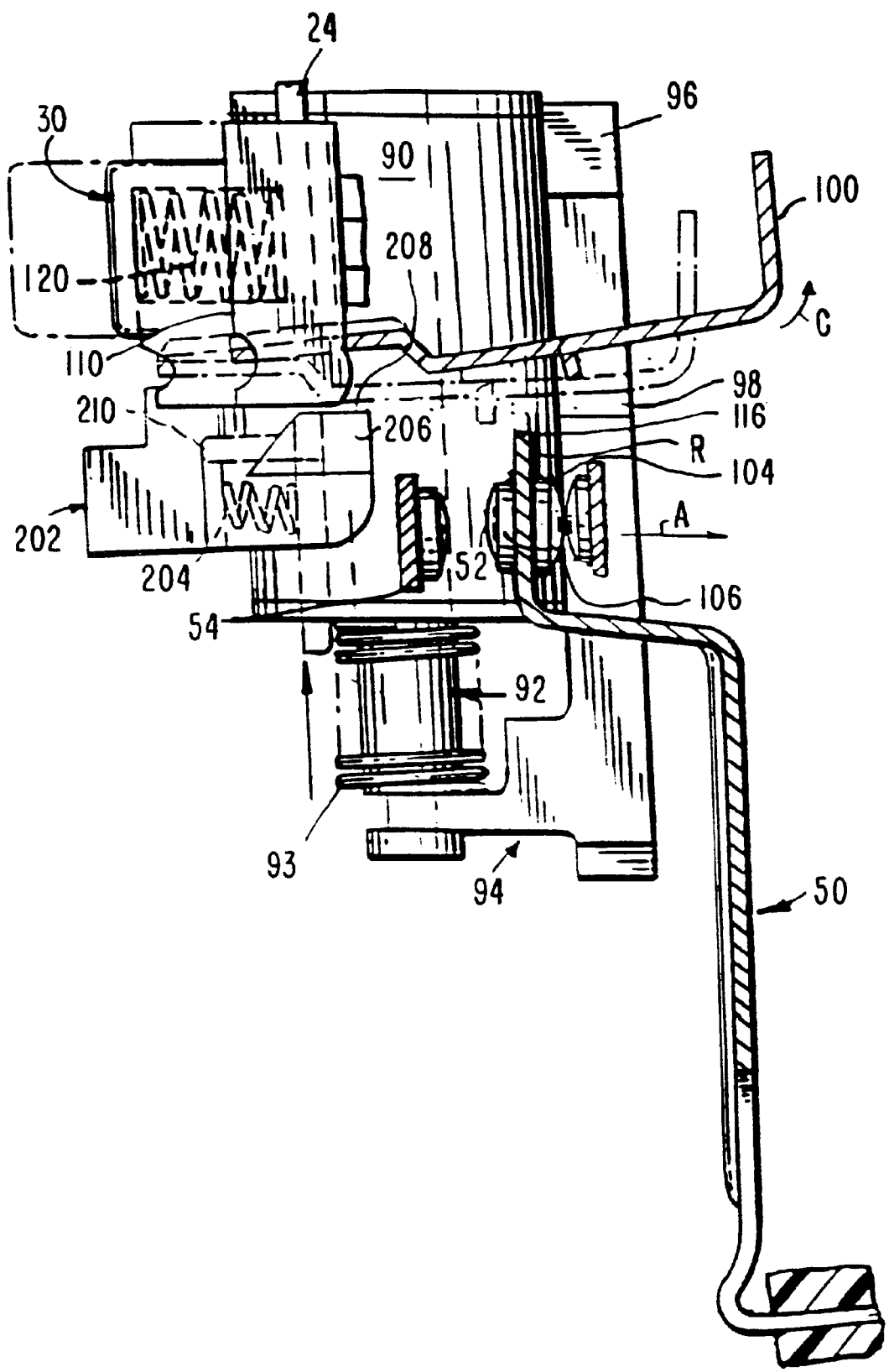
FIG. 16 is a side elevational view similar to FIG. 14, illustrating the components of the GFCI device during a reset operation.

Referring to FIGS. 14–16 an exemplary embodiment of the trip portion according to the present application includes a trip actuator 202, preferably a button, that is movable between a set position, where contacts 52 and 56 are permitted to close or make contact, as seen in FIG. 14, and a trip position where contacts 52 and 56 are caused to open, as seen in FIG. 15. Spring 204 normally biases trip actuator 202 toward the set position. The trip portion also includes a trip arm 206 that extends from the trip actuator 202 so that a surface 208 of the trip arm 206 moves into contact with the movable latching member 100, when the trip button is moved toward the trip position. When the trip actuator 202 is in the set position, surface 208 of trip arm 202 can be in contact with or close proximity to the movable latching member 100, as seen in FIG. 14.

Figure 18:
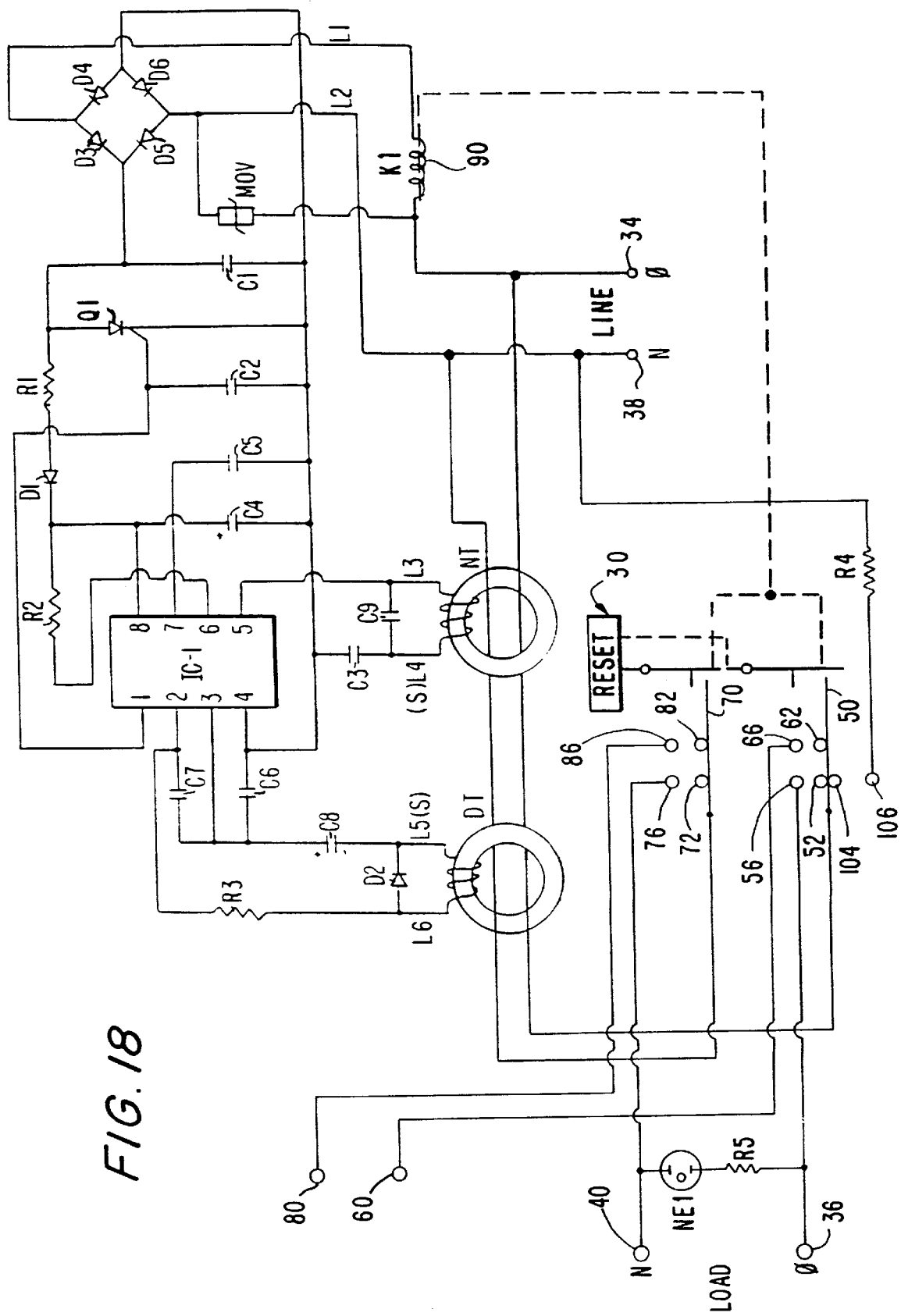
FIG. 18 is a schematic diagram of a circuit for detecting ground faults and resetting the GFCI device of FIG. 13.

In operation, upon depression of the trip actuator 202, the trip actuator pivots about point T of pivot arm 210 (seen in FIG. 15) extending from strap 24 so that the surface 208 of the trip arm 206 can contact the movable latching member 100. As the trip actuator 202 is moved toward the trip position, trip arm 206 also enters the path of movement of the finger 110 associated with reset button 30 thus blocking the finger 102 from further movement in the direction of arrow A (seen in FIG. 15). By blocking the movement of the finger 110, the trip arm 206 inhibits the activation of the reset operation and, thus, inhibits simultaneous activation of the trip and reset operations. Further depression of the trip actuator 202 causes the movable latching member 100 to pivot about point T in the direction of arrow C (seen in FIG. 15). Pivotal movement of the latching member 100 causes latching finger 102 of latching arm 100 to move out of contact with the movable contact arm 50 so that the arm 50 returns to its unstressed condition, and the conductive path is broken. Resetting of the device is achieved as described above. An exemplary embodiment of the circuitry used to sense faults and reset the conductive paths, is shown in FIG. 18.

As noted above, if opening and closing of electrical continuity in the neutral conductive path is desired, the above description for the phase conductive path is also applicable to the neutral conductive path.

Figure 19:
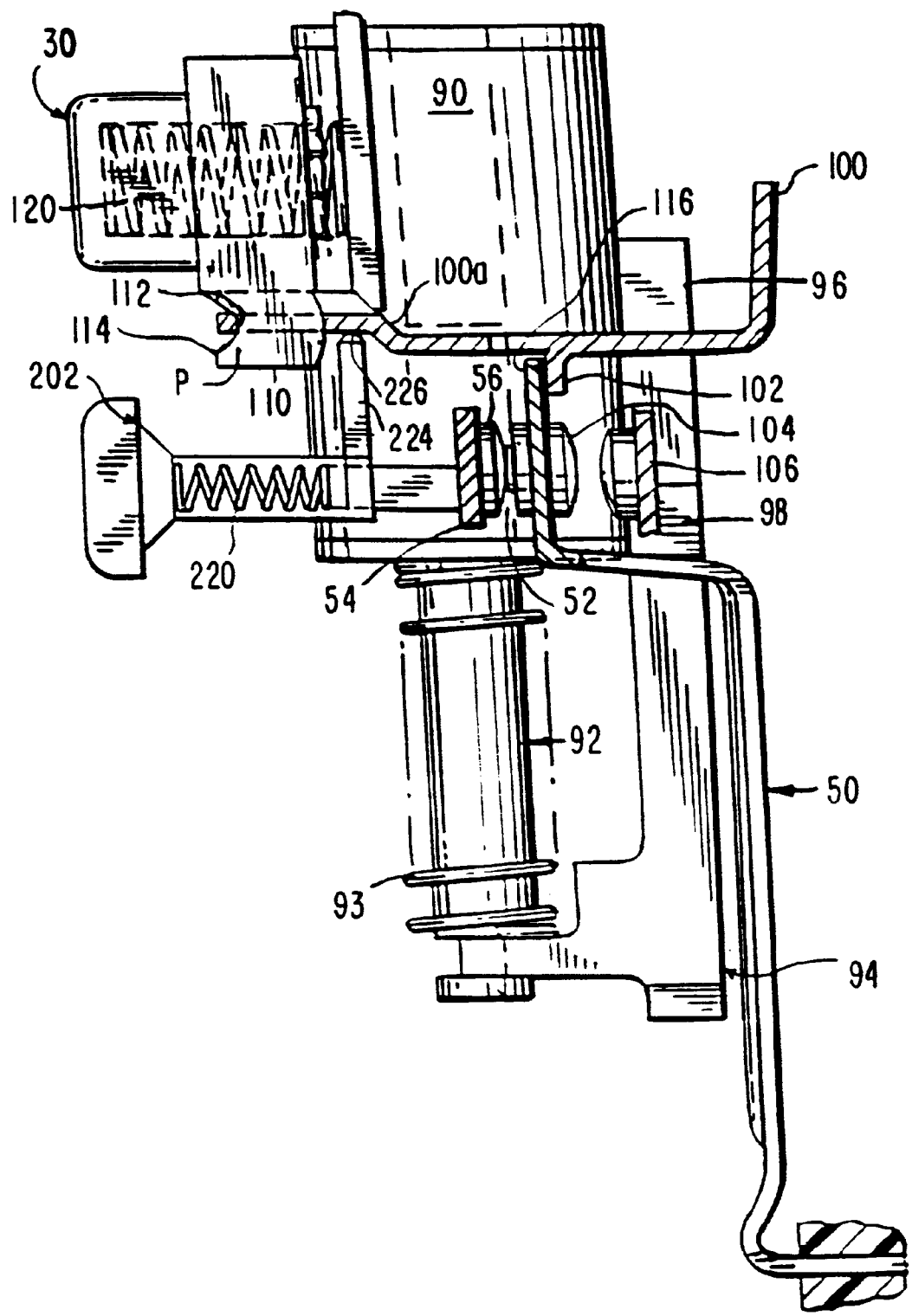
FIG. 19 is side elevational view, partly in section, of components of a portion of the alternative embodiment of the GFCI device shown in FIG. 13, illustrating the device in a set or circuit making position.
Figure 20:
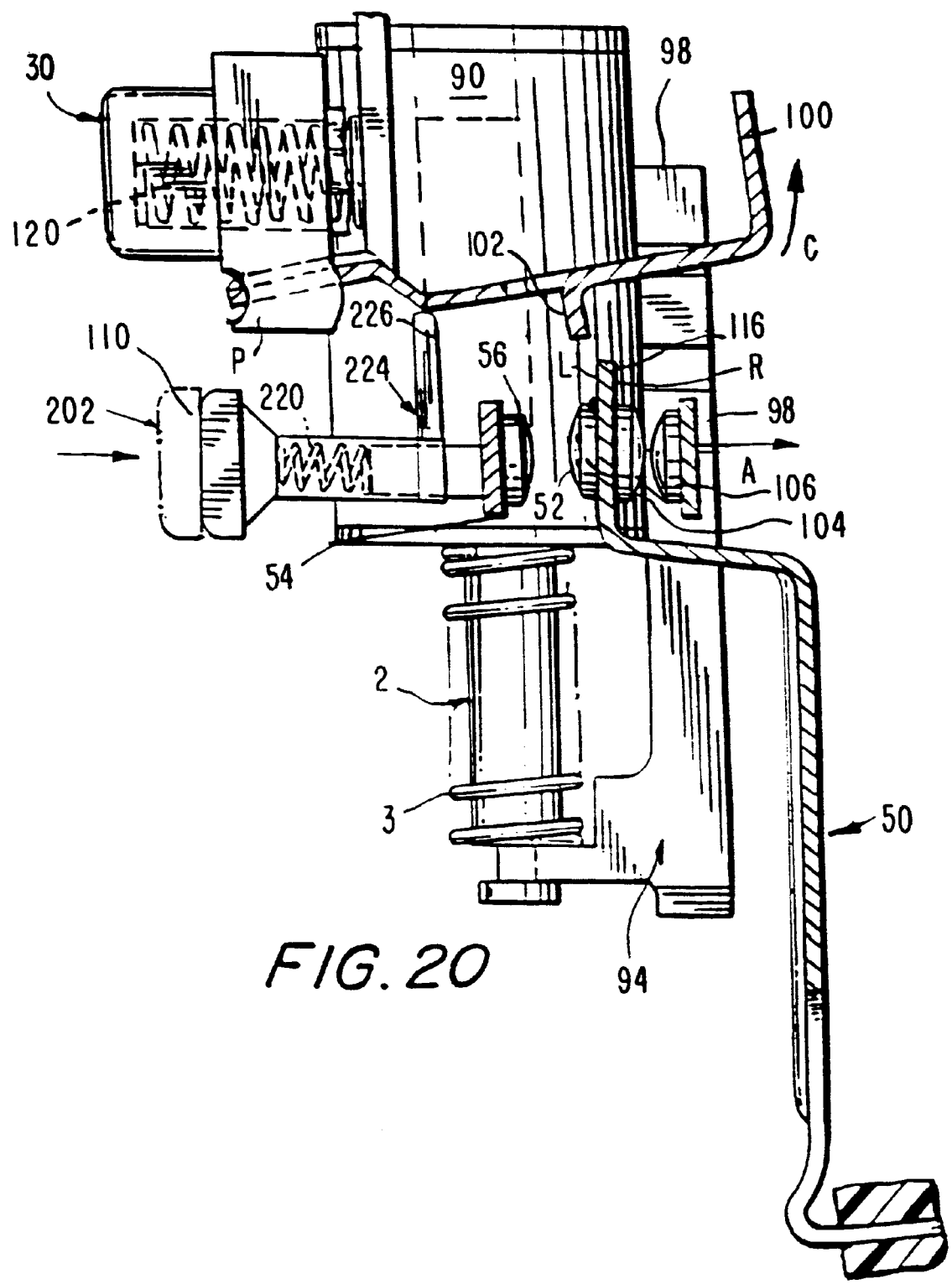
FIG. 20 is a side elevational view similar to FIG. 19, illustrating of the device in a circuit breaking position.

An alternative embodiment of the trip portion will be described with reference to FIGS. 19 and 20. In this embodiment, the trip portion includes a trip actuator 202 that at is movable between a set position, where contacts 52 and 56 are permitted to close or make contact, as seen in FIG. 19, and a trip position where contacts 52 and 56 are caused to open, as seen in FIG. 20. Spring 220 normally biases trip actuator 202 toward the set position. The trip portion also includes a trip arm 224 that extends from the trip actuator 202 so that a distal end 226 of the trip arm is in movable contact with the movable latching member 100. As noted above, the movable latching member 100 is, in this embodiment, common to the trip, circuit interrupting, reset and reset lockout portions and is used to make, break or lockout the electrical connections in the phase and/or neutral conductive paths.

In this embodiment, the movable latching member 100 includes a ramped portion 100a which facilitates opening and closing of electrical contacts 52 and 56 when the trip actuator 202 is moved between the set and trip positions, respectively. To illustrate, when the trip actuator 202 is in the set position, distal end 226 of trip arm 224 contacts the upper side of the ramped portion 100a, seen in FIG. 19. When the trip actuator 202 is depressed, the distal end 226 of the trip arm 224 moves along the ramp and pivots the latching member 60 about point P in the direction of arrow C causing latching finger 102 of the latching member 100 to move out of contact with the movable contact arm 50 so that the arm 50 returns to its unstressed condition, and the conductive path is broken. Resetting of the device is achieved as described above.

Figure 21:
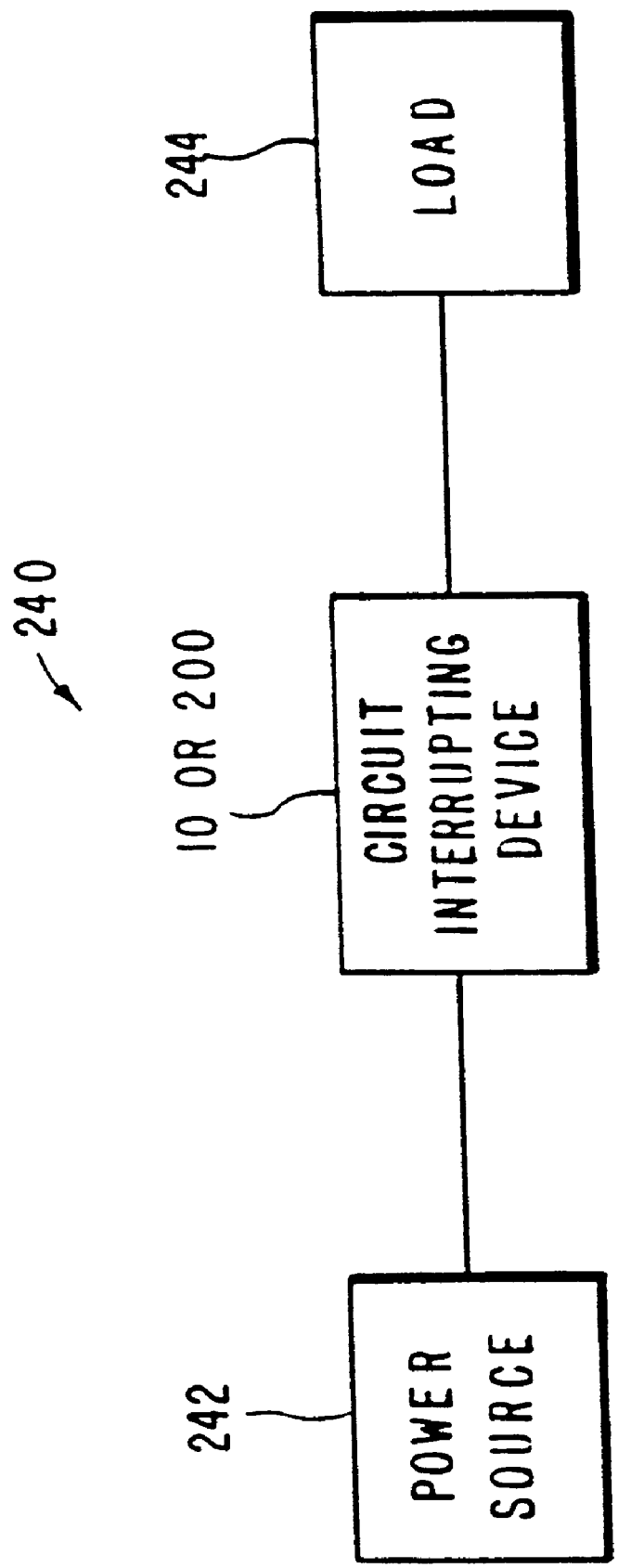
FIG. 21 is a block diagram of a circuit interrupting system according to the present application.

The circuit interrupting device according to the present application can be used in electrical systems, shown in the exemplary block diagram of FIG. 21. The system 240 includes a source of power 242, such as ac power in a home, at least one circuit interrupting device, e.g., circuit interrupting device 10 or 200, electrically connected to the power source, and one or more loads 244 connected to the circuit interrupting device. As an example of one such system, ac power supplied to single gang junction box in a home may be connected to a GFCI receptacle having one of the above described reverse wiring fault protection, independent trip or reset lockout features, or any combination of these features may be combined into the circuit interrupting device. Household appliances that are then plugged into the receptacle become the load or loads of the system.

As noted, although the components used during circuit interrupting and device reset operations are electromechanical in nature, the present application also contemplates using electrical components, such as solid state switches and supporting circuitry, as well as other types of components capable or making and breaking electrical continuity in the conductive path.

While there have been shown and described and pointed out the fundamental features of the invention, it will be understood that various omissions and substitutions and changes of the form and details of the device described and illustrated and in its operation may be made by those skilled in the art, without departing from the spirit of the invention.

What is claimed:

1. A reset lockout device comprising:
a reset connection to a switch for enabling a reset of the switch from a tripped position to a normal position, wherein the switch includes a switch trip condition sensor and a switch trip actuator for tripping the switch from the normal position to the tripped position in response to an indication from the switch trip condition sensor;
a test connection to the switch for enabling a test of the switch trip condition sensor and the switch trip actuator;
a reset actuator connected to the test connection and reset connection having a rest position, a test position for initiating the test and a reset position for initiating the switch reset to place the switch in a normal position; and
a reset actuator lockout connected to the reset actuator for blocking the enabling of the switch reset unless the test succeeds.

2. The device of claim 1 further comprising:
a trip connection to the switch for tripping the switch from the normal position to the tripped position using a second switch trip actuator;
wherein the reset actuator further comprises an initial trip position; and
wherein the reset actuator actuation sequence from a reset position must first engage the initial trip position, then the test position and then the reset position, wherein the reset actuator lockout blocks the reset actuator from reaching the reset position unless the test succeeds.

3. The device of claim 2 wherein,
the switch is capable of making and breaking an electrical circuit.

4. The device of claim 3 wherein,
the switch trip condition sensor is capable of sensing a ground fault or open neutral condition in the electrical circuit.

5. A circuit interrupting device comprising:
a housing;
a phase conductive path and a neutral conductive path each disposed at least partially within said housing between a line side and a load side, said phase conductive path terminating at a first connection capable of being electrically connected to a source of electricity, a second connection capable of conducting electricity to at least one load and a third connection capable of conducting electricity to at least one user accessible load, and said neutral conductive path terminating at a first connection capable of being electrically connected to a source of electricity, a second connection capable of providing a neutral connection to said at least one load and a third connection capable of providing a neutral connection to said at least one user accessible load;
a circuit interrupting portion disposed within said housing and configured to cause electrical discontinuity in said phase and neutral conductive paths between said line side and said load side upon the occurrence of a predetermined condition; and
a reset portion disposed at least partially within said housing and configured to reestablish electrical continuity in said phase and neutral conductive paths;
said circuit interrupting device further comprising a reset lockout portion that prevents reestablishing electrical continuity in said phase and neutral conductive paths if said circuit interrupting portion is non-operational, if an open neutral condition exists or if a reverse wiring condition exists, wherein said reset portion comprises:
a reset button; and
at least one reset contact which when depressed is capable of contacting at least a portion of said phase conductive path to cause said predetermined condition, wherein if said circuit interrupting portion is operational, the circuit interrupting portion is activated to disable said reset lockout portion and facilitate reestablishing electrical continuity in said phase and neutral conductive paths, and wherein if said circuit interrupting portion is non-operational, said reset lockout portion remains enabled so that reestablishing electrical continuity in said phase and neutral conductive paths is prevented; and wherein said phase conductive path comprises a plurality of contacts that are capable of opening to cause said electrical discontinuity in said phase conductive path and closing to reestablish electrical continuity in said phase conductive path at both said line and load sides, and wherein said neutral conductive path comprises a plurality of contacts that are capable of opening to cause said electrical discontinuity in said neutral conductive path and closing to reestablish electrical continuity in said neutral conductive path, between said line and load sides.

6. The circuit interrupting device according to claim 5, wherein said circuit interrupting portion causes said plurality of contacts of said phase and neutral conductive paths to open.

7. The circuit interrupting device according to claim 6, wherein said reset portion causes said plurality of contacts of said phase and neutral conductive paths to close.

8. The circuit interrupting device according to claim 5, wherein said circuit interrupting portion includes an electromechanical circuit interrupter used to cause electrical discontinuity in said phase and neutral conductive paths, and sensing circuitry used to sense the occurrence of said predetermined condition.

9. The circuit interrupting device according to claim 8, wherein said electro-mechanical circuit interrupter comprises a coil assembly, a movable plunger responsive to energizing of said coil assembly and a banger attached to said plunger, wherein movement of said plunger is translated to movement of said banger, and wherein movement of said banger causes electrical discontinuity in said phase and neutral conductive paths.

10. The circuit interrupting device according to claim 5 further comprising a trip portion disposed at least partially within said housing and configured to cause electrical discontinuity in said phase and neutral conductive paths independently of said circuit interrupting portion operation.

11. The circuit interrupting device according to claim 10, wherein said trip portion comprises a trip actuator accessible from an exterior of said housing and a trip arm extending from said trip actuator, said trip arm being configured to mechanical cause electrical discontinuity in said phase and neutral conductive paths, if said trip actuator is actuated.

12. The circuit interrupting device according to claim 11, wherein said trip actuator comprises a button.

13. The circuit interrupting device according to claim 5, wherein said predetermined condition comprises a ground fault, an arc fault, an appliance leakage fault or an immersion fault.

14. A circuit interrupting device for use with an electrical wiring system having at least one conductor comprising:
    a line side connection capable of being electrically connected to a source of electricity for connecting to the electrical wiring system;
    a load side connection capable of being electrically connected to a load side conductor for providing electricity to load side;
    a user load connection capable of conducting electricity to at least one load for providing an electrical connection to the electrical wiring system;
    a first conductive path capable of providing an electrical connection between the line side connection and the user load connection;
    a second conductive path capable of providing an electrical connection between the line side connection and the load side connection;
    a circuit interrupter configured to cause electrical discontinuity in said first conductive path and said second conductive path upon the occurrence of at least one predetermined condition;
    a reset portion configured to reestablish electrical continuity in said first conductive path and said second conductive path;
    a reset lockout portion that prevents reestablishing electrical continuity in said first conductive path and said second conductive path if said circuit interrupter is non-operational or if an open neutral condition exists;
    wherein activation of said reset portion first simulates at least one of the predetermined conditions, wherein if said circuit interrupter is operational, the circuit interrupter causes said reset lockout portion to be disabled to facilitate reestablishing electrical continuity in said first and second conductive paths.

15. The device of claim 14 wherein,
    the reset lockout portion prevents reestablishing electrical continuity in said first conductive path and said second conductive path if said circuit interrupter is non-operational, if an open neutral condition exists or if a reverse wiring condition exists; and
    wherein activation of said reset portion first simulates at least one of the predetermined conditions, wherein if said circuit interrupter is operational and if said circuit interrupting device is not reverse wired to the electrical wiring system, the circuit interrupter causes said reset lockout portion to be disabled to facilitate reestablishing electrical continuity in said first and second conductive paths.

16. The circuit interrupting device according to claim 14 further comprising an independent trip portion and a predetermined condition sensor where said independent trip portion is configured to cause electrical discontinuity in said first and second conductive paths independently of said predetermined condition sensor.

17. The circuit interrupting device according to claim 14, wherein said predetermined condition comprises a ground fault.

18. The circuit interrupting device according to claim 14, wherein said predetermined condition comprises a ground fault or an arc fault.

19. The circuit interrupting device according to claim 14, wherein said predetermined condition comprises an appliance leakage fault.

20. The circuit interrupting device according to claim 14, wherein said predetermined condition comprises an immersion fault.

* * * * *